United States Patent
Gorrell et al.

(10) Patent No.: US 10,781,122 B2
(45) Date of Patent: Sep. 22, 2020

(54) MEMBRANE FILTRATION APPARATUS AND PROCESS FOR REUSE OF INDUSTRIAL WASTEWATER

(71) Applicant: KEMCO SYSTEMS CO. LLC., Clearwater, FL (US)

(72) Inventors: Carroll Gorrell, Largo, FL (US); Gerard Johan Van Gils, St. Petersburg, FL (US)

(73) Assignee: KEMCO SYSTEMS CO. LLC, Clearwater, FL (US)

( * ) Notice: Subject to any disclaimer, the term of this patent is extended or adjusted under 35 U.S.C. 154(b) by 548 days.

(21) Appl. No.: 15/135,541

(22) Filed: Apr. 21, 2016

(65) Prior Publication Data
US 2017/0166468 A1    Jun. 15, 2017

Related U.S. Application Data

(60) Provisional application No. 62/267,662, filed on Dec. 15, 2015.

(51) Int. Cl.
*B01D 61/00* (2006.01)
*C02F 9/00* (2006.01)
(Continued)

(52) U.S. Cl.
CPC .............. *C02F 9/00* (2013.01); *B01D 61/025* (2013.01); *B01D 61/12* (2013.01); *B01D 61/147* (2013.01);
(Continued)

(58) Field of Classification Search
CPC .... B01D 23/00; B01D 23/0002; B01D 37/00; B01D 37/04; B01D 37/041; B01D 37/043; B01D 37/045; B01D 37/046; B01D 36/00; B01D 36/02; B01D 61/00; B01D 61/02; B01D 61/025; B01D 61/08; B01D 61/12; B01D 61/14; B01D 61/142; B01D 61/147; B01D 61/18; B01D 61/22; B01D 61/58;
(Continued)

(56) References Cited

U.S. PATENT DOCUMENTS

| 4,610,792 | A | | 9/1986 | Van Gils et al. |
| 6,110,376 | A | * | 8/2000 | Savage ................ B01D 61/022 210/652 |

(Continued)

FOREIGN PATENT DOCUMENTS

EP    1885664    3/2011

OTHER PUBLICATIONS

Bhattacharya et al., Water Resources and Industry 3 (2013) 48-62 (Year: 2013).*

*Primary Examiner* — Allison G Fitzsimmons
(74) *Attorney, Agent, or Firm* — Woodling, Krost and Rust

(57) ABSTRACT

Laundry, industrial or food processing wastewater is purified to the degree that it can be reused. Water quality is ensured through the final process of reverse osmosis ("RO") which removes dissolved contaminants such as mineral hardness, soils and residual detergents. The process combines a ceramic tubular cross-flow membrane filter to remove the suspended solids, oils and greases ahead of the RO. The RO process employs high temperature, low fouling membranes. This enables the RO process to operate sustainably, i.e. without fouling, plugging or membrane degradation.

12 Claims, 16 Drawing Sheets

(51) Int. Cl.
*C02F 1/66* (2006.01)
*C02F 1/44* (2006.01)
*B01D 71/02* (2006.01)
*B01D 61/14* (2006.01)
*B01D 61/02* (2006.01)
*B01D 61/12* (2006.01)
*B01D 61/22* (2006.01)
*C02F 103/02* (2006.01)
*C02F 103/00* (2006.01)
*C02F 103/32* (2006.01)
*C02F 1/00* (2006.01)

(52) U.S. Cl.
CPC .......... *B01D 61/22* (2013.01); *B01D 71/024* (2013.01); *C02F 1/441* (2013.01); *C02F 1/444* (2013.01); *C02F 1/66* (2013.01); *B01D 2317/06* (2013.01); *C02F 1/008* (2013.01); *C02F 2103/002* (2013.01); *C02F 2103/02* (2013.01); *C02F 2103/32* (2013.01); *C02F 2209/005* (2013.01); *C02F 2209/03* (2013.01); *C02F 2209/04* (2013.01); *C02F 2209/05* (2013.01); *C02F 2209/06* (2013.01); *C02F 2209/40* (2013.01); *C02F 2301/08* (2013.01); *C02F 2303/20* (2013.01); *C02F 2303/24* (2013.01)

(58) Field of Classification Search
CPC ........ B01D 63/00; B01D 63/08; B01D 69/06; B01D 2311/00; B01D 2311/04; B01D 2311/06; B01D 2311/08; B01D 2311/10; B01D 2311/12; B01D 2311/18; B01D 2311/25; B01D 2313/18; B01D 2313/19; B01D 2315/00; B01D 71/441; B01D 2317/06; C02F 9/00; C02F 1/441; C02F 1/444; C02F 1/66; C02F 1/008; C02F 2103/002; C02F 2103/02; C02F 2103/32; C02F 2209/005; C02F 2209/03; C02F 2209/04; C02F 2209/05; C02F 2209/06; C02F 2209/40; C02F 2301/08; C02F 2303/20; C02F 2303/24
USPC ... 210/749, 767, 805, 90, 87, 101, 102, 103, 210/137, 142, 143, 322, 323.1, 348, 210/500.1, 500.21
See application file for complete search history.

(56) References Cited

U.S. PATENT DOCUMENTS

| | | |
|---|---|---|
| 6,177,011 B1 | 1/2001 | Hachisuka et al. |
| 6,413,425 B1 | 7/2002 | Hachisuka et al. |
| 2008/0105617 A1* | 5/2008 | Oklejas ............... B01D 61/022 210/637 |
| 2011/0198290 A1* | 8/2011 | Oklejas, Jr. ........... B01D 61/06 210/652 |

* cited by examiner

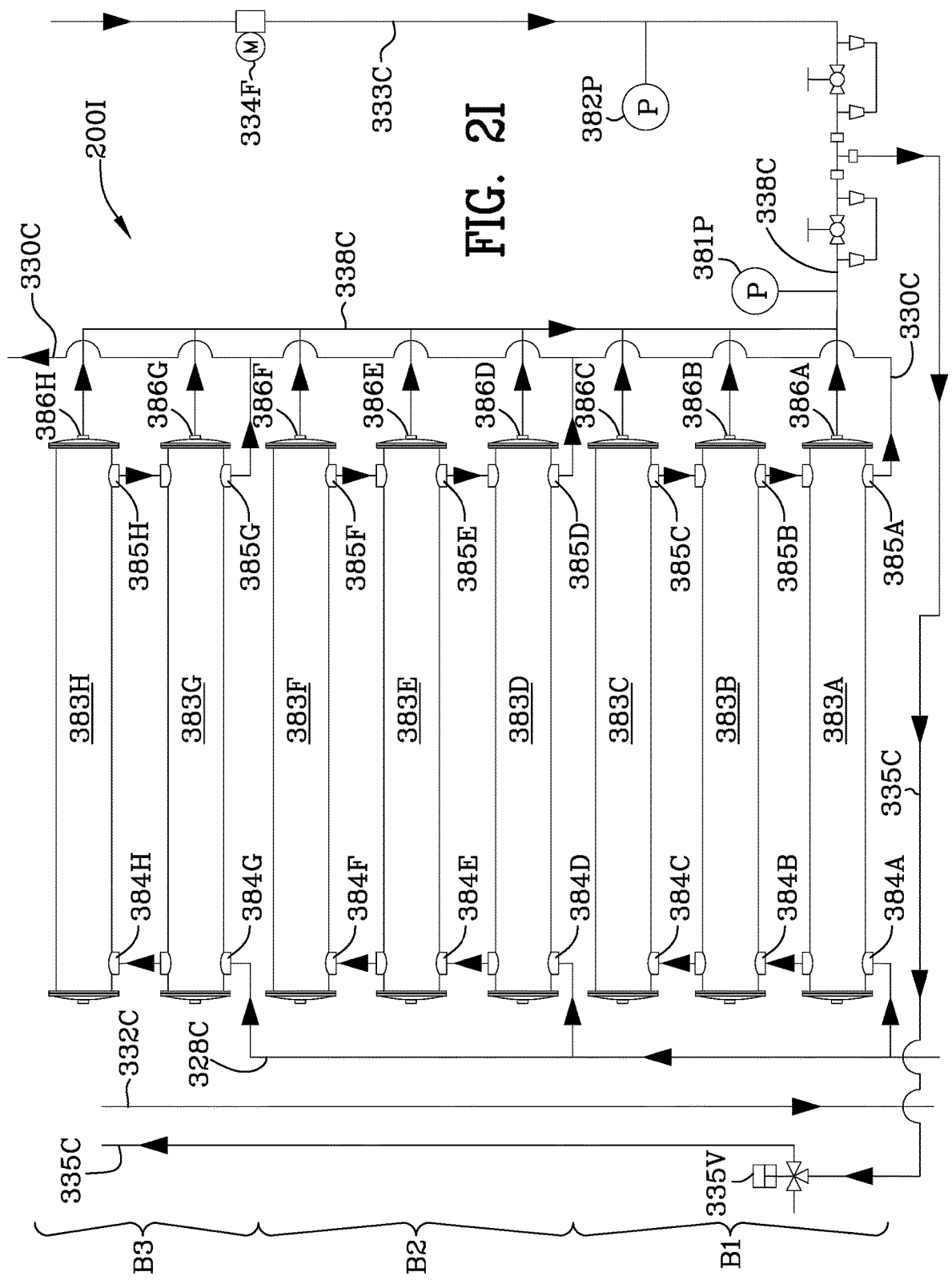

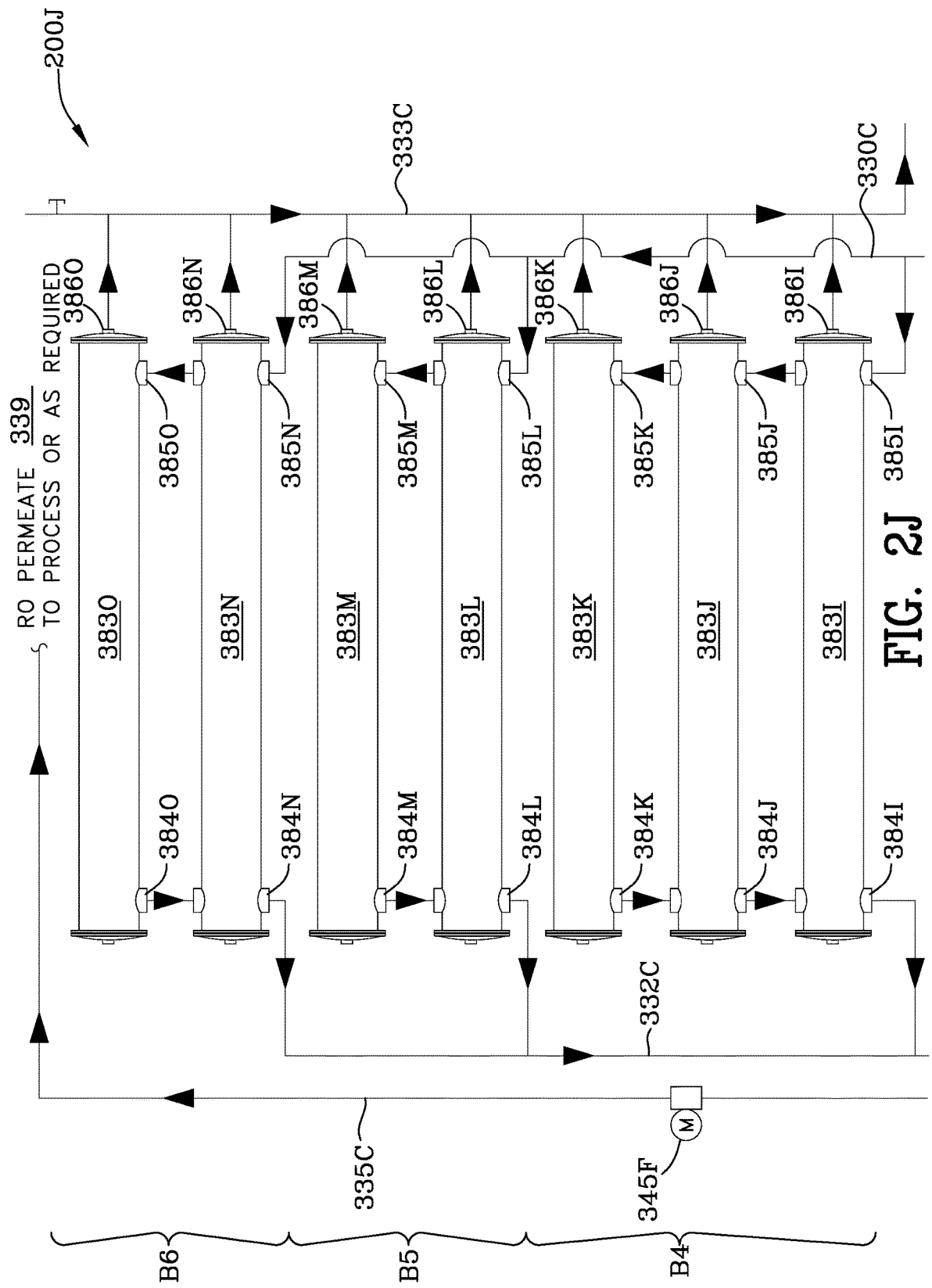

MEMBRANE FILTRATION APPARATUS AND PROCESS FOR REUSE OF INDUSTRIAL WASTEWATER

This application claims the benefit of U.S. Provisional Patent Application Ser. No. 62/267,662 filed Dec. 15, 2015, entitled: MEMBRANE FILTRATION PROCESS FOR REUSE OF INDUSTRIAL WASTEWATER which is incorporated by reference herein in its entirety.

FIELD OF THE INVENTION

This invention is in the field of filtration processes for industrial and commercial wastewater streams.

BACKGROUND OF THE INVENTION

U.S. Pat. No. 6,413,425 is incorporated herein by reference hereto in its entirety. U.S. Pat. No. 6,177,011 is incorporated herein by reference hereto in its entirety. European patent EP 1885 664 is incorporated herein by reference hereto in its entirety. U.S. Pat. No. 4,610,792 is incorporated herein by reference hereto in its entirety.

U.S. Pat. No. 6,413,425 states: "A reverse osmosis composite membrane comprises a sponge layer, and a separation layer formed on a surface of the sponge layer, wherein at least one substance selected from the group consisting of an electrically neutral organic substance and an electrically neutral polymer is present in the separation layer or a surface of the separation layer is coated with at least one substance selected from the group consisting of an electrically neutral organic substance and an electrically neutral polymer, and wherein the specific surface area of the layer in which the at least one substance is present or the separation layer before the surface coating is in the range of 2 to 1,000. The reverse osmosis composite membrane has a high salt rejection, a high water permeability, and a high fouling tolerance, and permits practical desalination at a relatively low pressure."

U.S. Pat. No. 6,177,011 states: "reverse osmosis composite membrane that has a high salt rejection, a high water permeability, and a high fouling tolerance, and permits practical desalination at a relatively low pressure is provided by coating the surface of a reverse osmosis membrane of aromatic polyamide with polyvinyl alcohol (PVA), for example, and controlling the surface zeta potential of the separation layer within ±10 mV at pH 6. This reverse osmosis composite membrane is electrically neutral and controls the electrical adsorption of membrane-fouling substances having a charge group present in water. Therefore, a high separation property can be maintained without fouling the membrane even if water containing a surfactant or a transition metal component is supplied as raw water."

European patent EP 1 885 664 B1 recites "Method for producing a wear-resistant reaction bound ceramic filtering membrane, wherein a porous metallic or non-metallic support is provided with a suspension for the production of a green body, wherein the suspension is obtained from a dispersing agent and a disperse phase, and wherein the disperse phase can be obtained from at least one ceramic raw material of the group of metal nitrides and optionally at least one further ceramic raw material, characterized in that the green body produced in this manner is baked at a temperature of 700° C. to 1250° C. under atmospheric pressure in oxidizing atmosphere for obtaining a phase change of at least the ceramic raw material."

U.S. Pat. No. 4,610,792 states "Wastewater is treated with activated carbon, lime, and filter aid, and subjected to membrane filtration to provide water free from suspended solids and having a TOC levels less than about 200 mg/L and total solids less than about 2000 mg/L."

SUMMARY OF THE INVENTION

A water filter is disclosed and claimed. The water to be filtered is used in industrial applications, laundry applications, and food processing applications.

The water filter includes: a coarse prefiltration or screen in fluidic communication with a feed tank; a ceramic microfilter unit/module, said ceramic microfilter unit/module includes an inlet, an outlet, a reject outlet, and an abrasion-resistant ceramic membrane filter; said feed tank includes a discharge to a first pump, said first pump is connected to a second pump, said second pump is connected to said inlet of ceramic microfilter unit/module, said first and second pumps extract water from said feed tank and force it through said ceramic microfilter unit/module; said reject outlet of said ceramic microfilter connected to said second pump; a concentrate reject valve in communication with said reject outlet of said microfilter; a first control loop for rejecting concentrate through said concentrate reject valve, said first control loop includes a flow control device for controlling said concentrate reject valve; a feed and neutralization tank, said feed and neutralization tank includes an inlet and an outlet; a filtrate pipe extending from said outlet of said ceramic microfilter unit/module to said inlet of said feed and neutralization tank; a pH control loop in fluidic communication with said feed and neutralization tank, said pH control loop includes a pH sensor and a pump for injecting acid into said feed and neutralization tank; a reverse osmosis filter, said reverse osmosis filter includes an inlet, and outlet and a reject port, said reverse osmosis filter includes a low foul, high temperature membrane; said outlet of said feed and neutralization tank includes a discharge to a third pump, said third pump is connected to a fourth pump, said fourth pump is connected to said inlet of said reverse osmosis filter; said reject port of said reverse osmosis filter interconnected to said inlet of said fourth pump; a reject valve is interconnected with said reject port and is controlled based on the total dissolved solids in the water emanating from the reject port; and, said outlet of said reverse osmosis filter is connected to a permeate pipe which routes water for disposal or reuse.

A water filter is disclosed and claimed wherein a ceramic microfiltration (CMF) system and a reverse osmosis (RO) filtration system are used. The ceramic microfiltration, CMF, system includes: a source of water; a CMF feed pump for pumping the water from the source of water and through a pretreatment element and into a CMF recirculation loop; and, means for adjusting the pH of the water before the water enters the CMF recirculation loop. The CMF recirculation loop includes a CMF recirculation pump, a CMF module, a return conduit carrying CMF concentrate back to the CMF recirculation pump, and a CMF concentrate reject conduit interconnected with the CMF return conduit for disposal of the CMF concentrate reject. The CMF concentrate reject conduit includes a CMF concentrate reject valve for controlling the amount of the CMF concentrate reject flow discharged. A CMF concentrate reject flow meter measures CMF concentrate reject flow in the CMF concentrate reject. The CMF module includes a ceramic element and the ceramic element includes ceramic filter membranes. The CMF recirculation pump supplies water to and through the ceramic filter membranes of the ceramic element. The CMF module includes a CMF concentrate reject port for communication of CMF concentrate reject to the CMF return conduit.

A CMF filtrate conduit is in communication with the CMF module. The CMF module includes a filtrate port for communication of CMF filtrate in the CMF filtrate conduit to a RO feed tank. A CMF filtrate flow meter in the CMF filtrate conduit measures CMF filtrate flow. Means for selecting a desired CMF concentration factor and means for computing an actual CMF concentration factor based on the CMF filtrate flow and the CMF concentrate reject flow are employed. And, means for controlling the CMF concentrate reject valve based on the concentration factor are used.

The reverse osmosis, RO, system includes the RO feed tank which stores and receives CMF filtrate water from the ceramic filtration system and is interconnected with a RO feed pump for pumping the CMF filtrate water through a pretreatment element and into an RO recirculation loop. The RO recirculation loop includes a RO recirculation pump, a RO membrane filter housing, a RO return conduit carrying RO concentrate back to the RO recirculation pump, a control valve in the RO return conduit, and a RO concentrate reject conduit interconnected with the RO return conduit for disposal of the RO concentrate reject. The RO concentrate reject conduit includes a RO concentrate reject valve for controlling the amount of the RO concentrate reject flow discharged. A RO concentrate reject flow meter in the concentrate reject conduit measuring RO concentrate reject flow is used. The RO recirculation pump supplies water to and through the first stage of the RO filtration. The RO filter housing includes a high temperature, low fouling RO membrane. The RO filter housing includes a RO concentrate reject port for communication of RO concentrate reject to the RO return conduit. A RO filtrate conduit is in communication with the RO filter housing. The RO filter housing includes a RO filtrate port for communication of RO filtrate for reuse. A RO filtrate flow meter is in the RO filtrate conduit for measuring RO filtrate flow. Means for selecting a desired RO concentration factor and means for computing an actual RO concentration factor based on the RO filtrate flow and the RO concentrate reject flow are used. Means for controlling the RO concentrate reject valve based on the concentration factor and means for computing the differential pressure across the RO filter housing are used. And, means for controlling the control valve in the RO conduit varying the flow of RO concentrate through the RO return conduit are also employed to maintain constant differential pressure across the RO housing.

A process for filtering laundry wastewater, industrial wastewater or food processing wastewater is disclosed and claimed using the ceramic microfiltration system in combination with a high temperature, low fouling reverse osmosis filtration system.

It is an object of the invention to use an abrasion resistant ceramic microfilter in combination with a high temperature, anti-fouling membrane in a reverse osmosis filter to clean laundry waste streams and/or industrial waste streams and/or oily waste streams.

It is an object of the invention to use RO for laundry water treatment.

It is an object of the invention to use high temperature and low fouling RO membranes.

It is a further object of the invention to use CMF to prefilter the water and thus use an entire process consisting of CMF and RO.

DESCRIPTION OF DRAWINGS

FIGS. 2I and 2J are schematics of banks of reverse osmosis housings in the recirculation loop.

DESCRIPTION OF THE INVENTION

Figure 1:
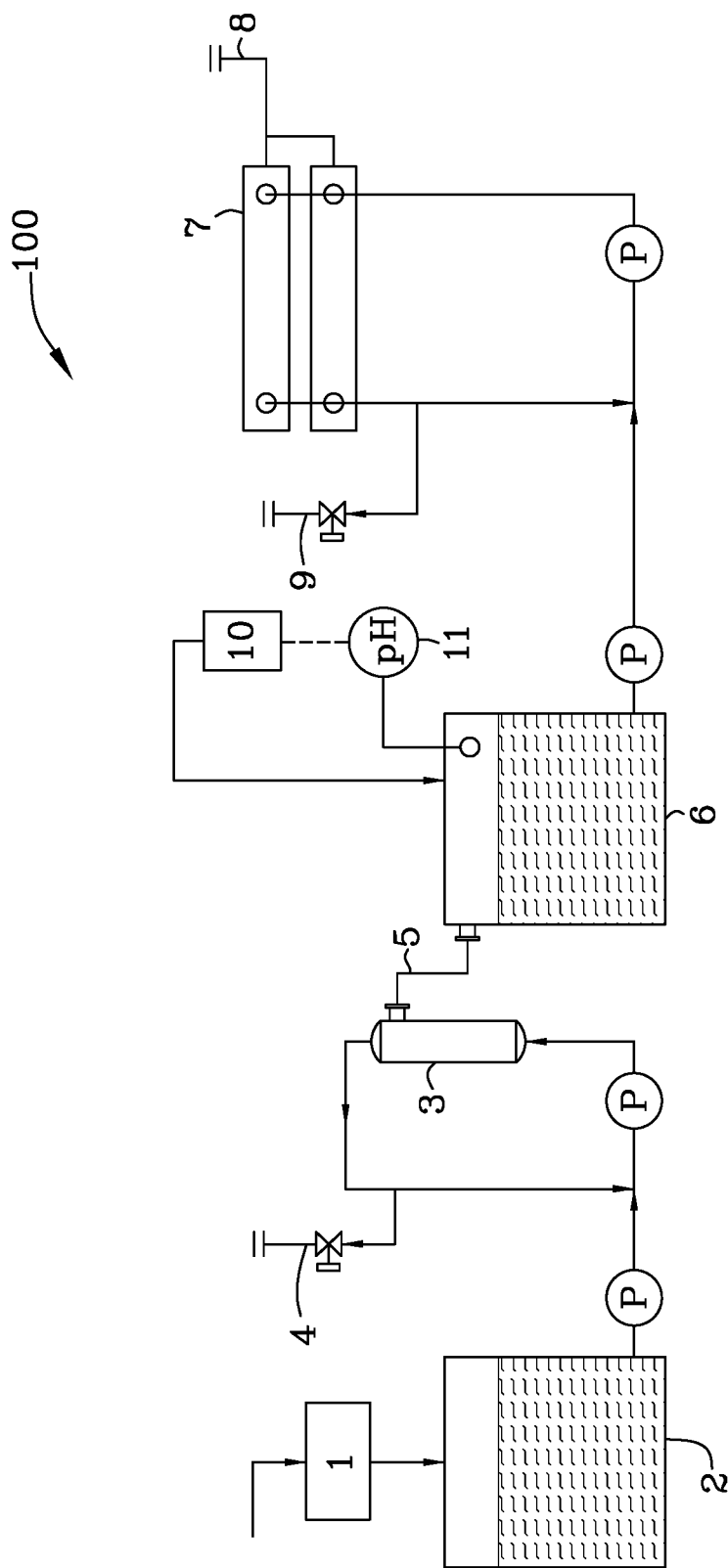
FIG. 1 is a schematic of a first embodiment of the overall process illustrating the ceramic filtration portion and the reverse osmosis portion.
Figure 1A:
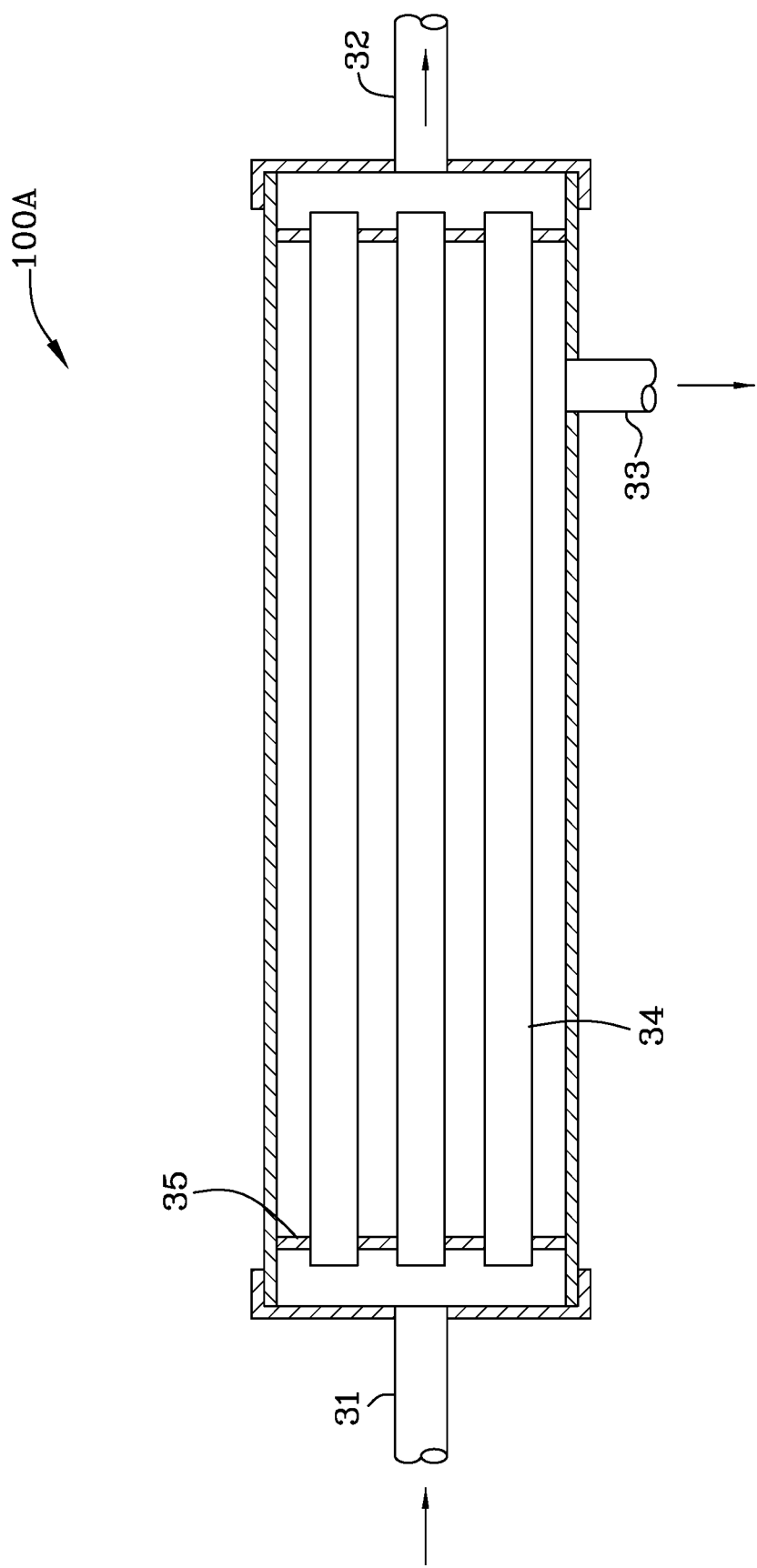
FIG. 1A is the schematic sectional view of the ceramic filtration portion of the first embodiment of the process.

FIG. 1 shows a first embodiment of the overall filtration process, along with attendant tanks and pumps. FIG. 1A is an illustration of the ceramic filter.

The process and apparatus include a membrane filtration process for reuse of industrial laundry wastewater as well as a membrane filtration process for reuse of other waste streams.

Wastewater is pre-filtered or screened for large solids 1 and then collected in the Collection/Feed Tank 2. From there it is pumped to the ceramic filter unit/module 3. A recirculation pump pumps the water to the Ceramic Membrane Filter Unit/module 3; from there the rejected solids and major portion of the bulk liquid volume exit the ceramic membrane filters 34 and return via port 32 to the recirculation pump. The rejected solids are discharged from the loop via a concentrate modulating and control valve 4; the clean, filtered water aka "filtrate" is discharged to the next step in the process 5.

The ceramic filter unit/module is illustrated in FIG. 1A and includes a wastewater inlet 31, a wastewater outlet 32, a filtrate outlet 33, a plurality of ceramic membrane filters 34 and a tube sheet and seal plate 35.

The filtrate water is collected in a Feed and Neutralization Tank 6 wherein acid is injected in order to neutralize the alkalinity of the wastewater using an acid metering pump 10 which is controlled by a pH sensor 11. The neutralized water is pumped to the recirculation pump which sends the water to the second step of filtration which is the Reverse Osmosis ("RO") filtration step 7. The water with rejected solids exits the RO filters and returns to the recirculation pump. The rejected solids are discharged from this loop via a reject modulating and control valve 9; the filtered water also known as "permeate" is discharged and collected 8. This permeate is the product water which is of high quality—free of contaminants—and can be reused in the industrial process.

Performance of the Filtration System

The process is successful in the removal of pollutants as shown in the table below. The dissolved solids (called "TDS" for Total Dissolved Solids) are significantly removed, mainly through the function of the RO membranes. This works in conjunction with the CMF, which removes the oils, greases, and Total Suspended Solids ("TSS"). The overall result is that the purified product water is of high quality, and can be reused in the industrial process.

The following is a table of results of the invention. The performance of the invention as indicated in the table of results is quite remarkable. Use of a two step, two stage filtration process, namely the ceramic microfiltration process and the reverse osmosis process with the low fouling results in reusable water for industrial processes, including, but not limited to, industrial wastes such as fracking wastewater and laundry wastes. The invention employs an abrasion resistant filtration step (process) which removes the oil and grease from the waste stream. The removal of the oil and grease from the waste stream enables effective operation of the low fouling membrane of the reverse osmosis filtration step (process).

The membranes used in the process described in this invention are of a special, high temperature, design. They can tolerate temperatures of 170 degrees, F. This is a benefit to the industrial end user, since hot water can be reused resulting in significant savings of heat energy—savings of natural gas energy.

RO Membrane—Low Fouling Characteristics

Yet another beneficial feature of the RO system is the use of special, low fouling membranes. The membrane materials, while still constructed of thin film composites, are enhanced with a low fouling surface. This is accomplished with the use of a material that minimizes the membrane surface charge. In doing so, the membrane is less likely to attract waste constituents that could stick to the surface due to electrostatic charge attraction. The long term effect of this feature is reduced fouling, and ease of membrane cleaning and restoration.

Figure 2:
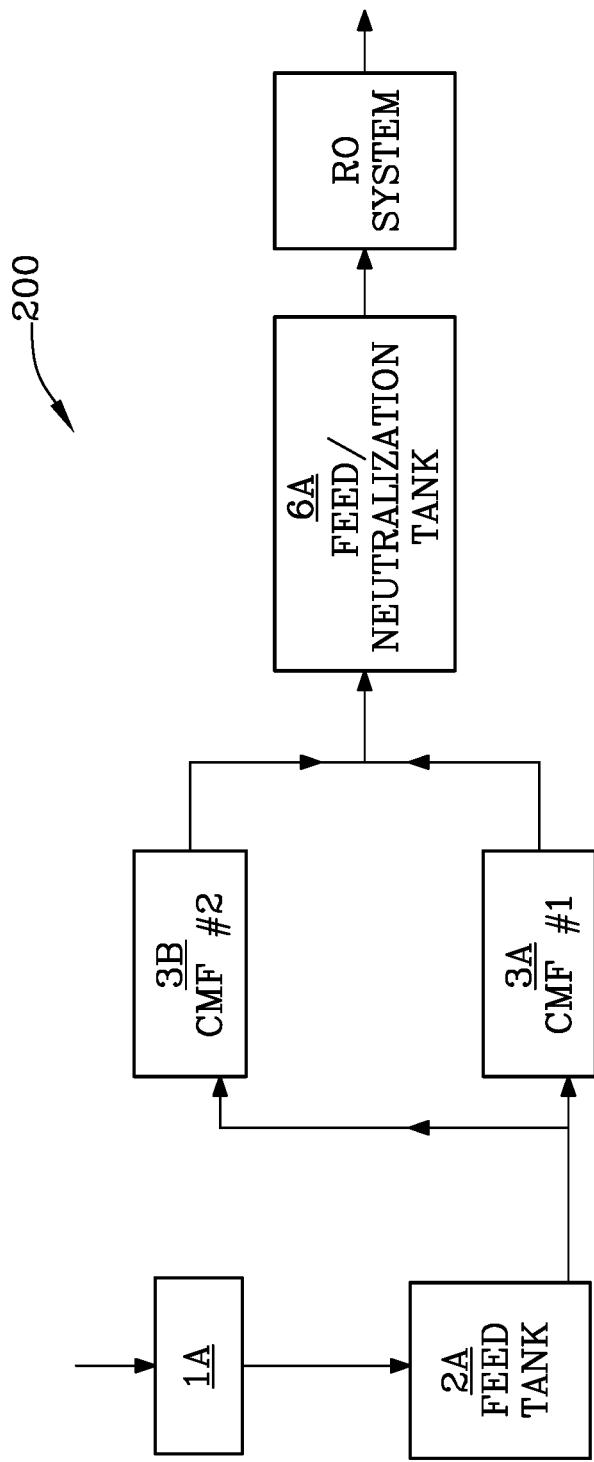
FIG. 2 is a schematic of a second embodiment of the overall process illustrating the ceramic filtration portion and the reverse osmosis portion.

FIGS. 2-2J illustrate the second embodiment of the invention,

The invention includes the use of a CMF system equipped with tubular, ceramic filter elements in crossflow configuration. Microfiltration removes to a high degree suspended and colloidal particles, emulsified oils and greases from wastewater, thus reducing parameters such as BOD, COD, TSS, and turbidity significantly. Ceramic filters are designed to withstand aggressive conditions, high temperatures and acids, alkaline and corrosive components, typical for many industrial wastewaters. Ceramic membranes can be cleaned aggressively if wastewater contaminants generate hard-to-remove accumulations. CMF systems are employed to either

| INDUSTRIAL UNIFORM WASTEWATER TREATMENT RESULTS | | | | | |
|---|---|---|---|---|---|
| Parameter | RAW* | CMF* | % Removal | RO* | % Removal |
| Copper | 0.4801 | 0.291 | 39.39 | 0.014 | 97.08 |
| Cadmium | 0.005 | ND | 100.00 | ND | 100.00 |
| Chromium | 0.031 | ND | 100.00 | ND | 100.00 |
| Lead | 0.091 | 0.06 | 34.07 | ND | 100.00 |
| Nickel | 0.03 | 0.023 | 23.33 | ND | 100.00 |
| Iron | 0.72 | 0.253 | 64.86 | 0.03 | 95.83 |
| Zinc | 1.32 | 0.825 | 37.50 | 0.035 | 97.35 |
| Sodium | 405 | 378 | 6.67 | 20.87 | 94.85 |
| Oil & Grease | 305 | 19 | 93.77 | 1.98 | 99.35 |
| TSS | 208 | 18.3 | 91.20 | 1.25 | 99.40 |
| TDS | 2,537 | 1599 | 36.97 | 63.1 | 97.51 |
| Chloride | 164 | 157 | 4.27 | 4.68 | 97.15 |
| Sulfate | 142 | 53 | 62.68 | 10.9 | 92.32 |
| Total Alkalinity | 840 | 480 | 42.66 | 45.5 | 94.58 |
| Magnesium | 2.46 | 1.14 | 53.66 | ND | 100.00 |
| Total Hardness | 113 | 27.7 | 75.49 | 3.25 | 97.12 |
| Color (units) | 8,240 | 85 | 98.97 | 6 | 99.93 |
| Total Organic Carbon | 520 | | | 15 | 97.12 |
| Odor (threshold odor number) | 16 | | | ND | 100.00 |

Note: Results are given in milligram per liter unless stated otherwise.

RO Membrane—High Temperature Capability

Another unique aspect to this process is in the selection of the RO membrane. The RO membrane is constructed of special materials, using special adhesives and materials of construction, which make the membrane suitable for high temperature water. To date, RO membranes have been widely constructed of thin film composite materials which can only tolerate temperatures of 113 degrees, Fahrenheit. Laundry wastewaters however typically have elevated temperature and temperatures normally range from 120 to 140 degrees.

recycle wastewater or to comply with discharge requirements by local, state and federal agencies.

FIG. 2 is a schematic of a second embodiment of the overall process illustrating the ceramic filtration process and the reverse osmosis process. Wastewater flows through prescreen or prefilter 1A and continues to feed tank 2A. The wastewater is then processed in ceramic microfiltration systems, CMF System #1 denoted by reference numeral 3A and CMF System #2 denoted by reference numeral 3B. CMF #1 and CMF #2 are in parallel and the effluent (filtrate) of both system flows to the feed/neutralization tank 6A. The wastewater is then further processed by the reverse osmosis system (RO System).

No specific position of any two way valve or any three-way valve is illustrated in connection with any drawing figure.

Figure 2A:
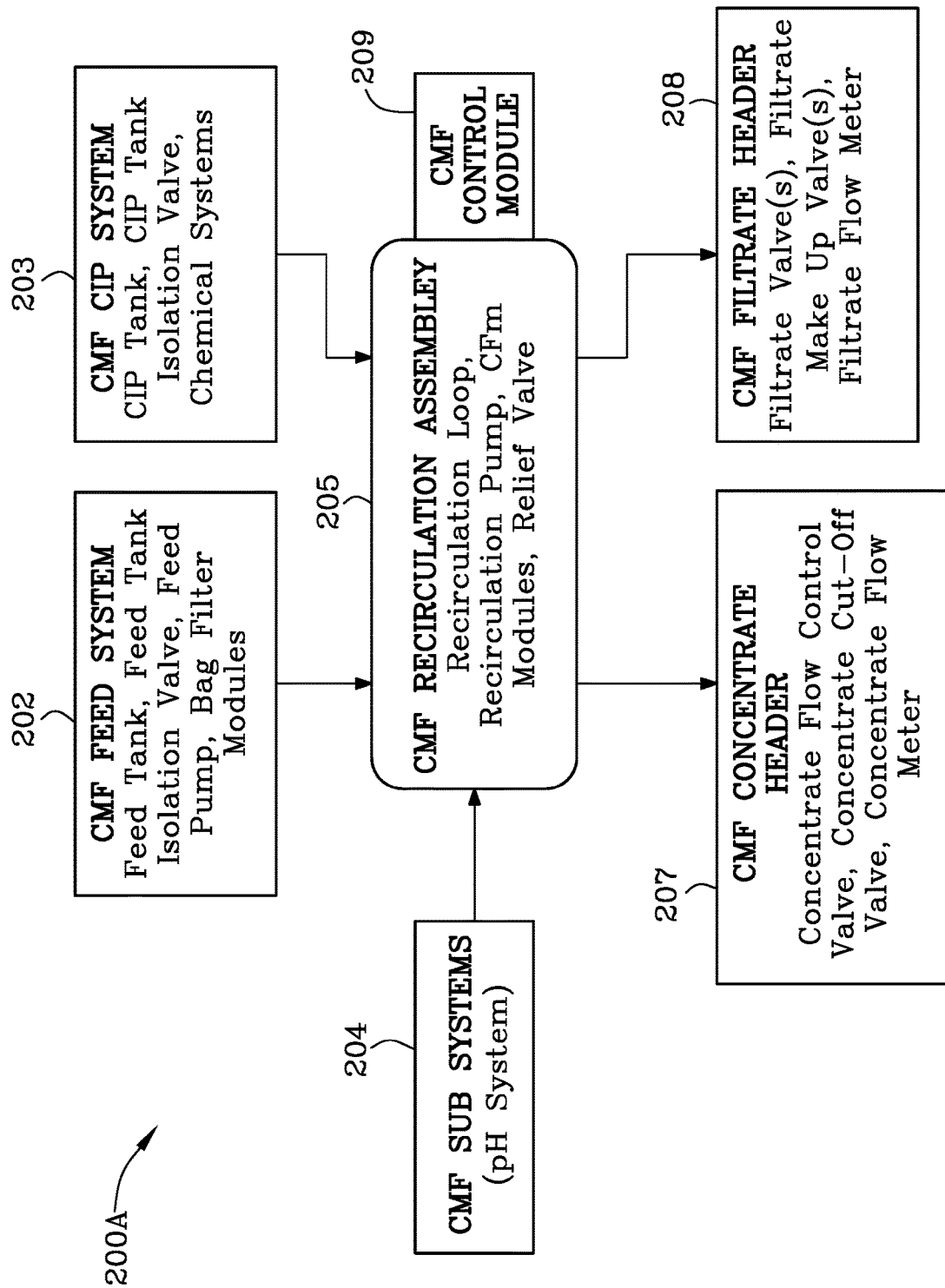
FIG. 2A is a generalized schematic of the second embodiment of the ceramic microfiltration system.

FIG. 2A is a generalized schematic 200A of the second embodiment of one of the ceramic microfiltration systems. The Ceramic Crossflow Microfiltration System (CMF) system can be regarded as a separation device, separating a wastewater feed stream into a filtered water stream 208 and a heavy concentrate stream 207. The CMF system consists of the following major components: CMF Feed System 202, CMF Clean-in-Place (CIP) System 203, CMF Recirculation Assembly 205, Filtrate Discharge 208, and Concentrate Discharge Header 207.

Figure 2B:
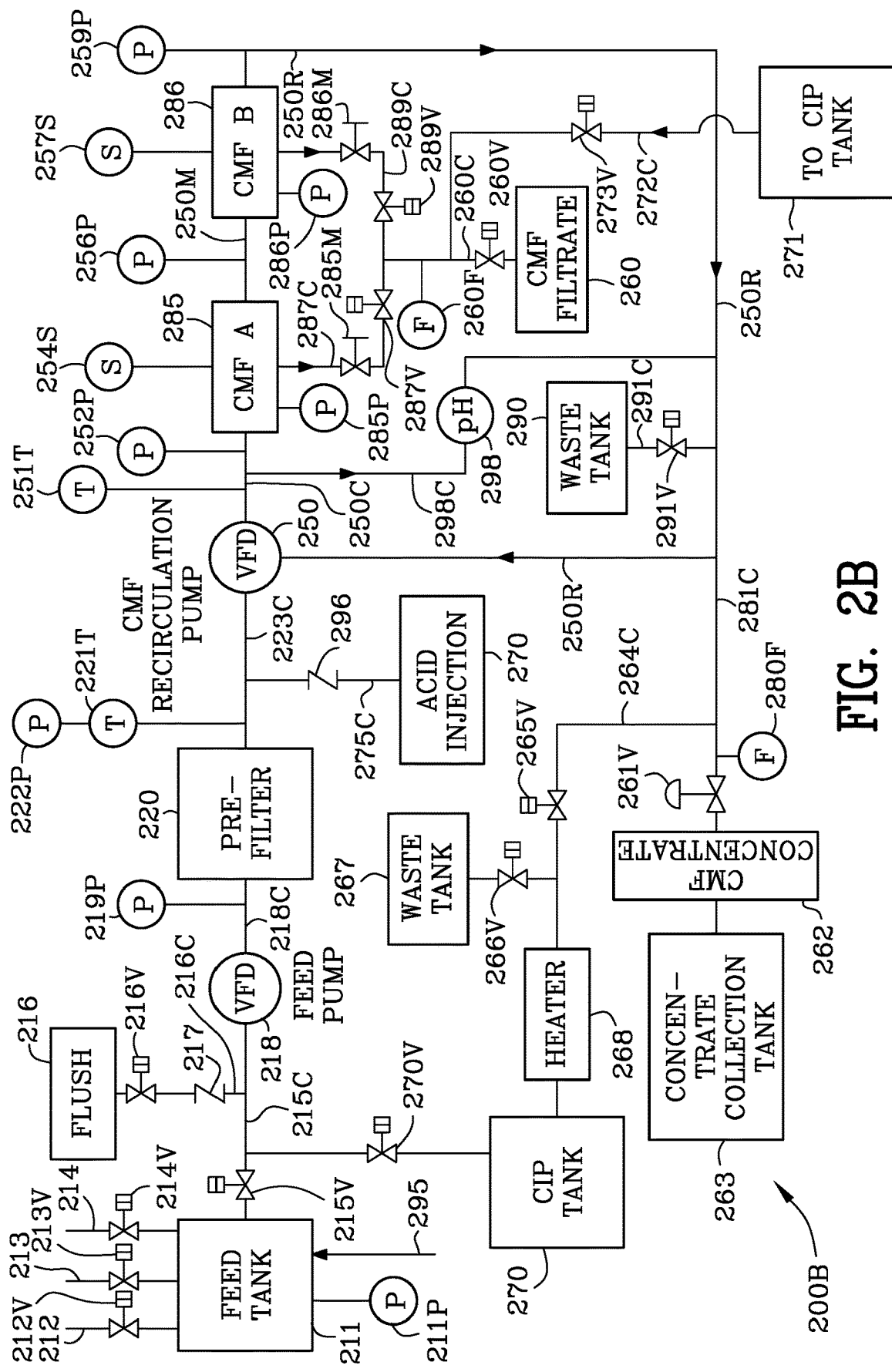
FIG. 2B is another schematic of the second embodiment of the ceramic microfiltration system.

FIG. 2B is another schematic 200B of the second embodiment of the ceramic microfiltration systems, CMF System #1. CMF system #2 is not disclosed herein as it is structurally and operationally the same as CMF System #1 except capacities are different. The example given herein in regard to the CMF Systems #1 and #2 is just one of many possible arrangements of CMF Systems. In some applications there may only be one CFM System and the structure of that system may be substantially different than the one illustrated and described herein.

CMF System #2, for example, has a different number of modules containing the containing the ceramic membranes. Feed water is admitted to the CMF feed tank 211 as indicated in FIG. 2B by arrow 295. From there, the CMF feed pump 218 pumps the wastewater through a bag-filter, prefilter module 220 into the CMF recirculation loop. Water is moved to feed pump 218 through conduit 215C. Valve 215C isolates feed tank 211 from the pump 218 during cleaning of the system. Feed pump 218 is driven by a variable frequency drive (VFD).

Figure 2C:
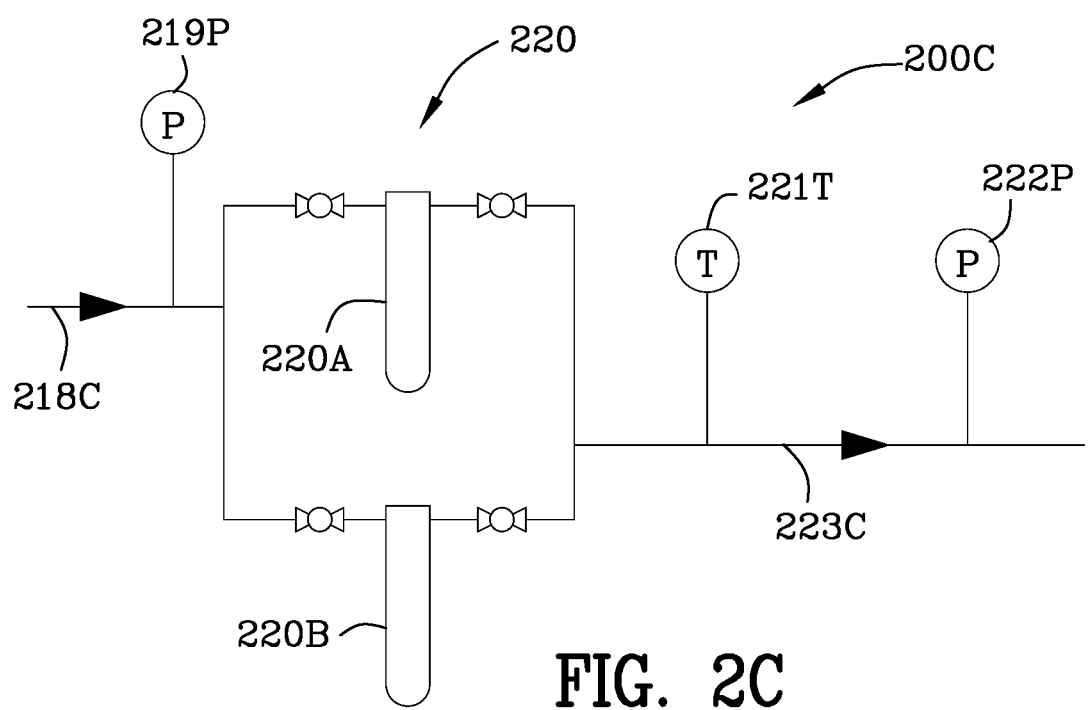
FIG. 2C is a schematic of the prefilter portion of the second embodiment of the ceramic microfiltration system.

FIG. 2C is a schematic 200C of the prefilter portion of the second embodiment of the ceramic microfiltration system. FIG. 2C illustrates the feed pump discharge conduit 218C entering the prefilter 220 and, in particular, entering the housings 220A, 220B and exiting therefrom in conduit 223C toward the recirculation pump 250. The pressure differential across the prefilter 220 is obtained from pressure transmitters 219P and 222 and this information is displayed to the operator at the control panel in regard to the need to clean the system.

The fluid is recirculated inside the recirculation loop by the CMF recirculation pump 250. The feed pump 218 and the recirculation pump 250 are both driven by variable frequency drives which can be operated at different speeds. Recirculated feed fluid passes through the CMF modules 285, 286 where microfiltration takes place. The CMF modules 285, 286 hold elements and the elements have channels therein. The channels have ceramic layers/membranes on the surfaces of the channels.

Pressurized fluid is allowed to pass in two directions: through the ceramic microfilter membrane channels into the concentrate discharge header 281C for collection or other appropriate treatment and disposal method, and through the ceramic microfilter membranes into the filtrate discharge header 260C for reuse in the process, discharge to sewer or for collection and further treatment by reverse osmosis. See FIG. 2B.

The CMF system continuously separates a water stream into a clean filtrate 260 and a heavy concentrate flow 262. The concentrate (or reject) flow is only a fraction of the feed flow but contains all of the rejected feed components. The feed flow rate is the sum of the filtrate rate plus the rejected concentrate flow rate. Filtrate flow is measured by meter 260F and the rejected concentrate rate is measured by meter 280F. The meters 260F, 280F are illustrated in FIG. 2B and they transmit and totalize flow therebetween and send this information to the PLC at the control panel. The ratio between the feed flow rate and the concentrate flow rate is referred to as the Concentration Factor:

$$Conc.Fact. = \frac{Flow_{Feed}}{Flow_{Conc.}}$$

The concentration factor is typically adjusted to 10 fold (10×) but can vary depending on the application. The concentration factor is selectable within limits and is input into the control system electronically at the control panel. Simply put, the reject concentrate flow rate is a fraction of feed flow rate and the feed flow rate is much larger than the concentrate flow rate.

A 10× concentration factor stands for 90% water recovery (the filtrate), while 10% of the original feed flow is removed as the concentrate. The concentrate is 10 times as "heavy" as the feed flow, containing almost all of the suspended and colloidal particles, emulsified oils and greases. The loop concentration will influence filtrate permeability through the membrane and CMF system efficiency will decline for concentration factor adjustments beyond a critical ratio. The programmable logic controller (PLC) continuously computes the concentration factor from flow meters 380F, 260F. The real time concentration factor is displayed on a Human Machine Interface CMF system status screen which is part of the CFM control module 209 illustrated in FIG. 2A.

Every wastewater is unique in its quality, concentration and composition and thus exhibits an individual diffusion rate through the microfiltration membrane, the so called flux rate. The total membrane surface area of a CMF system depends on the quantity of installed ceramic elements. Each CMF ceramic element has a specific number of channels; the microfiltration membrane being located on the surface of these channels. In practical terms, the flux rate can be expressed as the filtrate production for each ceramic element, measurement units are in gallons per square foot per day (GFD). The PLC computes flux rate from the filtrate flowmeter and divides it by the installed membrane surface area.

The effective pressure drop over the ceramic layers/membranes, the Transmembrane pressure (TMP), is determined from the pressure difference between the pressures inside the ceramic tubular elements and the back pressure the filtrate experiences on the filtrate side. The TMP is calculated as:

$$TMP = \frac{p_{CMF\_Module\_IN} + p_{CMF\_Module\_OUT}}{2} - p_{FILT}$$

Each of the modules 285, 286 has an inlet pressure and an outlet pressure. See FIG. 2B, inlet pressure transmitter 252P for module CMF A and inlet pressure transmitter for module CMF B. Outlet/discharge pressure transmitter 256P for CMF A and outlet/discharge pressure transmitter 259P for CMF B are shown in FIG. 2B. Pressure transmitter 256P is the intermediate pressure between CMF A and CMF B. The rejected concentrate of module CMF A, reference numeral 285, is fed to the inlet of the second module CMF B module, reference numeral 286 in conduit 250M. Inlet pressure 252P and outlet pressure 256P of module CMF A is measured and processed by the control module. Inlet pressure 256P of module CMF B is the output pressure of the first module, CMF A, and the outlet pressure 259P of module CMF B. Inlet and outlet pressures of the modules are dependent on system design and cannot be varied. Filtrate pressures 285P, 286P (and therefore the TMP) can be adjusted by the operator, using the filtrate globe valves 285M, 286M to obtain the filtrate flow 260.

Figure 2D:
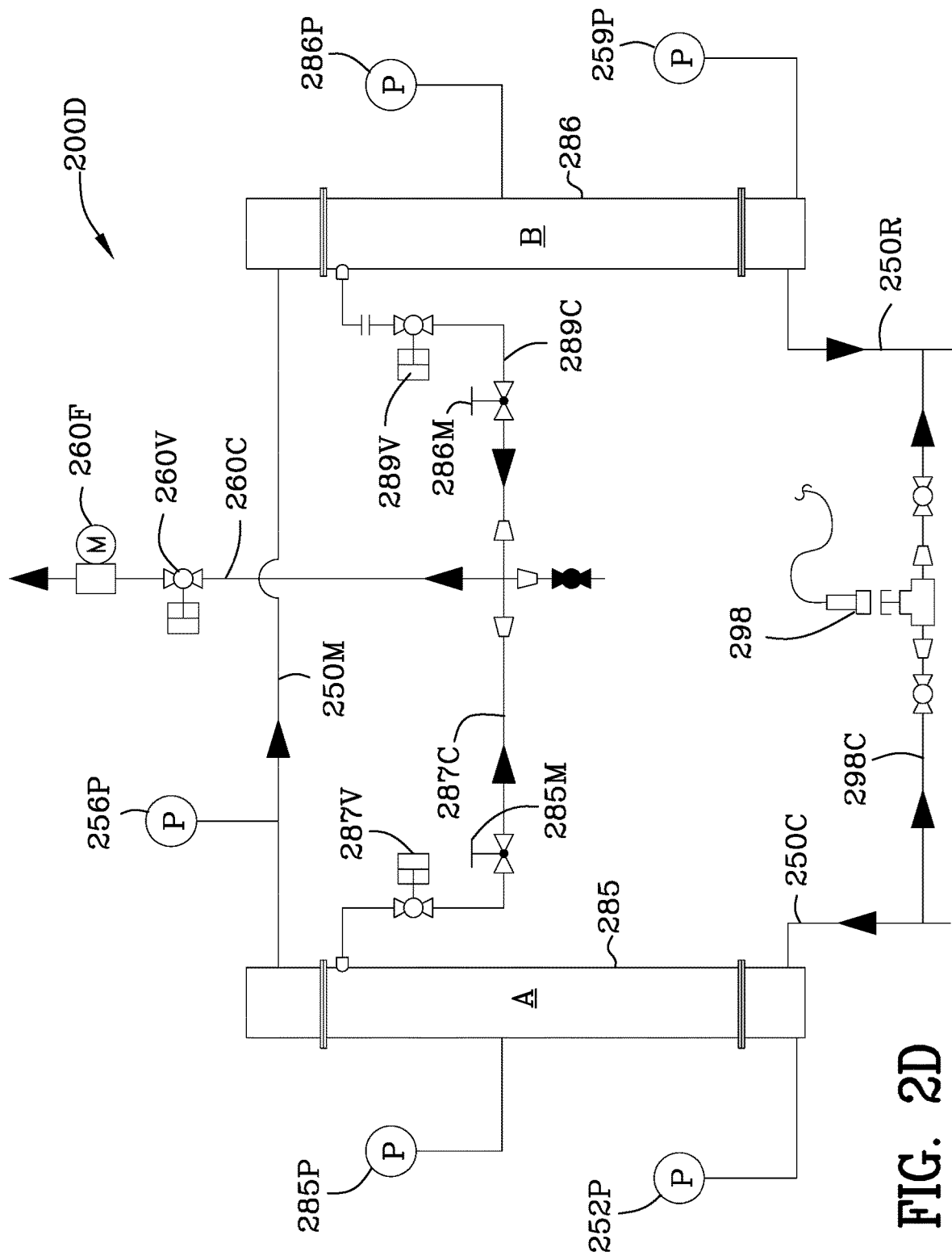
FIG. 2D is a schematic of the modules of the ceramic microfiltration system of the second embodiment.

FIG. 2D is a schematic 200D of the CMF modules 285, 286. Fluid enters module 285 and inlet pressure is sensed and transmitted by pressure transmitter 252P. Filtrate output pressure is sensed and transmitted by pressure transmitter 285P. Filtrate is removed from module 285 and passes through automatic shutoff valve 287V and manual globe valve 285M. Intermediate pressure of concentrate is sensed in conduit 250M which extends from module 285 to the inlet of module 286. The intermediate pressure of the concentrate in conduit 250M is the same as the inlet pressure to module 286. Filtrate output pressure is sensed and transmitted by transmitter 286P. Filtrate is removed from module 286 and passes through automatic shutoff valve 289V and manual globe valve 286M. Globe valves 285M, 286M can be adjusted to produce the desired flow through CMF System #1. Output pressure of module 286 is sensed and transmitted by pressure transmitter 259P where it is discharged to the recirculation loop 250R and returned to recirculation pump 250. A portion of the concentrate as a function of the concentrate factor is removed from the recirculation loop by conduit 281C. Flow control valve 261V resides in conduit 281C and controls flow therethrough. Flow through control valve 261V is controlled by the PLC. Control valve 261V is a modulated pneumatically operated valve. The flow therethrough is 10% of the sum of the filtrate flow and the concentrate flow using a concentration factor of 10.

Incompatible, "sticky" components in the wastewater can lead to a fouling layer build up on the membrane and increase the TMP. Generally speaking, the higher the TMP, the more build up that has accumulated on the membranes. The TMP is therefore an important indicator for system performance. Membrane separation is historically plagued by membrane fouling, a contaminant-layer build up on the membrane surface, suppressing filtrate flux. The CMF systems of the instant invention use a cross flow configuration and pH adjustment to prevent fouling from occurring. pH adjustment is made by the PLC. See FIG. 3 which is a schematic of the pH control system. The CMF membranes are tubular and therefore oriented in-line with the flow direction. Crossflow microfiltration allows filtrate to be removed perpendicularly to the flow while particles larger than the membrane pore diameter are retained within the recirculation loop 250R. Particulates cannot easily build up on the membrane surfaces since it is continuously swept away and recirculated at high velocities through the ceramic microfiltration elements. The retained fluid inside the recirculation loop 250 is referred to as the concentrate. The concentrate becomes more and more concentrated with particles until its concentration reaches a state of equilibrium due to concentrate removal in conduit 281C.

Figure 3:
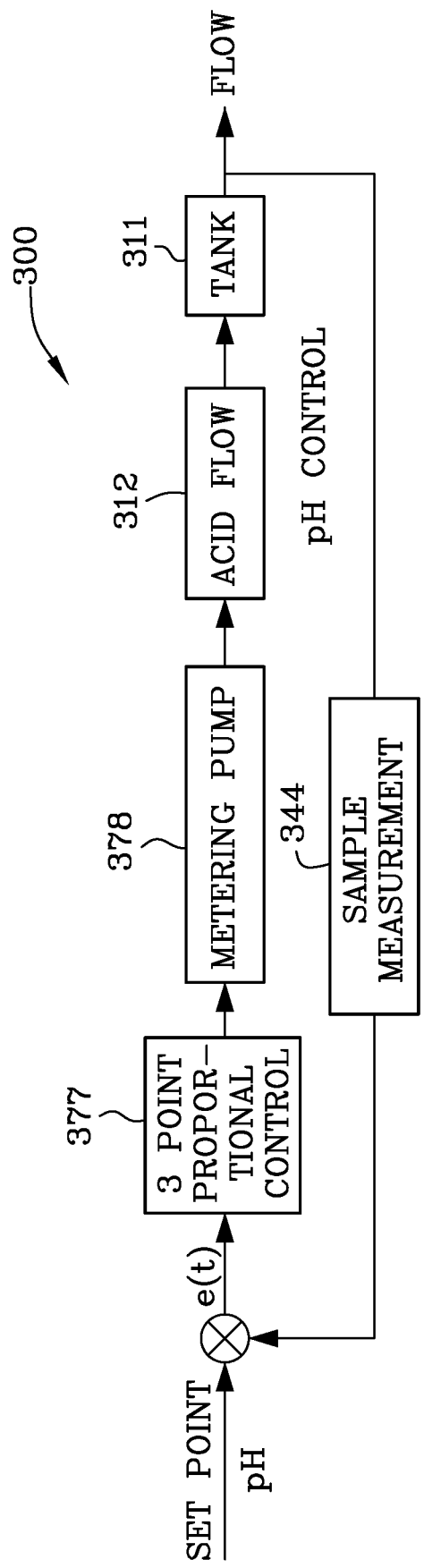
FIG. 3 illustrates the pH control of the ceramic microfiltration and reverse osmosis systems.

For wastewater, the water pH (water acidity or basicity) plays a critical role in the overall system performance. Wastewater components can become "sticky" to the ceramic membrane if pH is not correctly adjusted to an "optimum working" pH. This "optimum working" pH value is typically in the range of pH 7-10 but is application dependent. The CMF system operation adjusts wastewater feed pH to optimize the microfiltration process. The pH control schematic is illustrated in FIG. 3.

The wastewater system illustrated has multiple CMF skids and multiple CMF modules. The system set forth herein is by way of example only; fewer or more modules and skids may be used, as needed for the specific flow volume requirements of each installation.

The wastewater system illustrated has two CMF modules, A and B. CMF System #1, reference numeral 3A, illustrated in FIGS. 2 and 2B has two CMF modules, CMF A and CMF B. CMF System #2 has four modules. The structure of the systems is the same except for the number of modules employed in each.

The CMF System #1 has several major components, described in detail below. The CMF feed tank 211 is flat-bottomed and constructed of 304 stainless steel, 7 feet in diameter with a height of 10 feet and a total volume of approximately 2,800 gallons. The feed tank is split into two halves. One half contains wastewater that has been processed by a shaker screen and the other half contains water that has subsequently been treated through hydrocyclones and is ready to be fed to module CMF A.

The CMF CIP (Clean In Place) tank 270 provides a small volume tank to mix chemicals required for the CIP process. The CMF tank is 35 gallons, 16-inches in diameter and 42 inches tall constructed of Type 304 stainless steel.

The CMF feed pump 218 pumps wastewater that has been previously in the feed tank 211 through the bag filters and into the recirculation loop. The pump has a stainless steel impeller and case. It is rated for 125 gpm at 105' TDH with a 5 hp, 3600 rpm motor and is controlled with a VFD (Variable Frequency Drive). A prefilter 220 comprising a set of two bag filters and housings 220A, 220B is located downstream of the CMF feed pump and removes coarse contaminants from the feed wastewater to help protect and reduce fouling the CMF membranes. The typical filtration size is 200-400 µm. The housing 220, 220B are constructed of stainless steel. The equipment specified is by way of example only.

The CMF modules 285, 286 are constructed of stainless steel which holds the CMF elements vertically. CMF System #1 has two modules CMF A 285 and CMF B 286, which contain a number of ceramic microfiltration elements as needed to fulfill the flow requirements of the specific installation. The ceramic microfilters have a porous ceramic membrane layer with a nominal pore size of 0.05 micron. CMF System #2 (not shown) has 4 modules (not shown) each of which contains multiple elements, also containing ceramic membrane layers with a nominal pore size of 0.05 micron.

A recirculation pump 250 provides the movement of the fluid within the CMF recirculation loop. The recirculation loop is comprised of the recirculation pump 250, conduit 250C, CMF modules 285, 286, conduit 250M, and conduit 250R. The recirculation loop provides the required cross flow velocity to minimize fouling of the ceramic microfiltration elements. The recirculation pump 250 is a close-coupled, industrial centrifugal pump manufactured with an open, clog resistant impeller and driven with VFDs controlled by the control module. The recirculation pump of CMF System #1 is sized for 2,400 gpm at 80' TDH with a 75 hp, 1775 rpm motor.

The recirculation loop is in communication with a Clean In Place tank 270 which supplies chemicals to be used for cleaning the CMF filter modules 285, 286. An immersion heater 268 applies energy to the cleaning fluid in conduit 264C with Clean-In-Place tank 270. An immersion heater 268 is used to increase temperature of the water (and cleaning fluid) to increase the efficacy of cleaning and treatment of the microfiltration elements in modules 285, 286. The heater has a 5-inch flange with a temperature switch and is rated at 24 kW.

The CMF control panel is a 60-inch by 60-inch panel that houses a disconnect, transformer, motor starters, variable frequency drives, a PLC, input and output modules (both analog and digital), an Ethernet switch and router, and Hand-Off-Auto switches, pressure transducers, an air conditioner, and miscellaneous circuit breakers, fuses and relays. The front of the panel contains control switches, display lights which indicate the current operating conditions and a display indicating the operating parameters and conditions of the entire CMF System #1.

Pressure sensing transmitters 219P, 222P, 252P, 256P, 259P, 285P, and 286P measure and electronically communicate pressures of various locations of the CMF system with the input modules mounted in the control panel. The discharge pressure of the feed pump 219P, the module CMF A inlet pressure 252P, the intermediate pressure 256P between modules, CMF A and CMF B, the outlet pressure 259P, and the filtrate pressures 285P, 286P are monitored and processed by the PLC controller located in the control panel. From these pressure transmitters the transmembrane pressures are determined. Pressure transducer 211T is also used to measure level in the CMF feed tank and this pressures is used to control the VFD feed pump.

Flow meters monitor concentrate 280F and filtrate 260F discharge flow rates. Magnetic-inductive flowmeters 260F, 280F produce and a signal voltage directly proportional to the volumetric flow. The filtrate flow meter 260F has a measuring range of 0.1 to 250 gpm and the concentrate flow meter 280F has a measuring range of 0.1 to 26.4 gpm. The flow meters also provide a totalizer function (integrated flow) which is used to determine the total amount of CMF filtrate and CMF reject concentrate which enables the determination of the concentration factor. The flow meters 260F, 280F provide 4-20 mA output signals to the PLC.

Several isolation ball valves with pneumatic actuators 212V, 213V, 214V, 215V, 216V, 265V, 266V, 270V, 287V, 289V, 273V, 291V, provide 2-way (open/close) control of flow in the CMF system. The valves have solenoid pilot valves which control air to the valve actuators. The valves have manual overrides located near the CMF control panel. The feed tank is isolated by valve 215V enabling use of the CIP feature for cleaning. The CIP tank is further isolated from the CMF filtrate by valve 273V. Still further, the waste tank, is isolated from the recirculation loop by valve 291V, the heater 268 is isolated by valve 265V from the recirculation loop 250R and waste tank 267 is isolated from the recirculation loop by valve 266V.

Figure 3A:
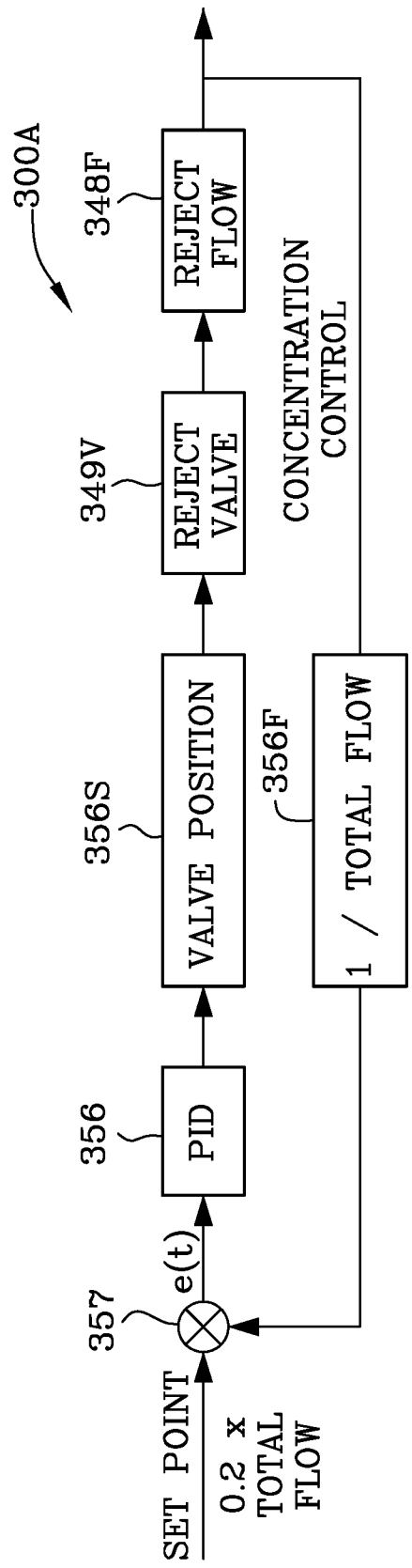
FIG. 3A illustrates the reject valve control of the ceramic microfiltration and reverse osmosis systems.

A ball valve 261V with a modulating actuator is provided in the CMF #1 system for control of CMF concentrate flow 262 from the recirculation loop 250R to the concentrate collection tank 263. Valve 261V modulates to control the flow of concentrate in conduit 281C out of the RECIRCULATION LOOP 250R and into the concentrate collection tank 263. The reject concentrate flow is controlled as set forth in FIG. 3A. Note that reference numerals used in FIG. 3A are for the control of the reject flow control valve used in the reverse osmosis system The schematic, however, is also applicable to the control of the reject valve of the CMF system.

A pH probe 298 is connected to the recirculation loop to measure the full pH range and is made of CPVC and HDPE. It has a flat-surface electrode and is self-cleaning. It provides a signal to the PLC for continuous monitoring of the system pH during normal operation of the system and during the CIP process/mode. pH control is illustrated in FIG. 3.

The CMF system of the instant invention is designed to be cleaned at regular time intervals. These intervals can be varied depending on the application. CMF systems must be cleaned regularly to prevent hard-to-remove residue accumulation. Also, a CIP procedure will become necessary if membrane flux rate has decreased significantly, attributable to CMF incompatible wastewater components. Generally, a flux rate decrease is due to formation of a membrane "fouling" layer. The flux rate of each module CMFA and CMF B is monitored continuously according to the aforementioned Transmembrane pressure (TMP) calculation. A clean in place procedure is instituted and chemicals supplied to the CIP tank are used in the CMF System #1 and the valves 215V, 260V isolate the feed tank 211 and the CMF filtrate output 260.

The foulant layer accumulated on the ceramic microfiltration elements can be removed using CIP chemicals such acids, bleach, caustic materials and appropriate cleaning solutions.

Ceramic membranes are employed in harsh environments and where difficult-to-remove residues are to be expected. These membranes can withstand strong chemicals as well as high temperatures. Cleaning solutions contain alkaline, acidic and/or corrosive substances and handling of these chemicals must be performed with caution.

A series of CIP protocols enable successful membrane cleaning of many different contaminants. A standard CIP will target the removal of an organic foulant layer, using a caustic/bleach solution under elevated temperatures, followed by an acidic removal of mineral scaling.

Reverse osmosis system described in connection with the second embodiment, FIGS. 2-2I.

Figure 2E:
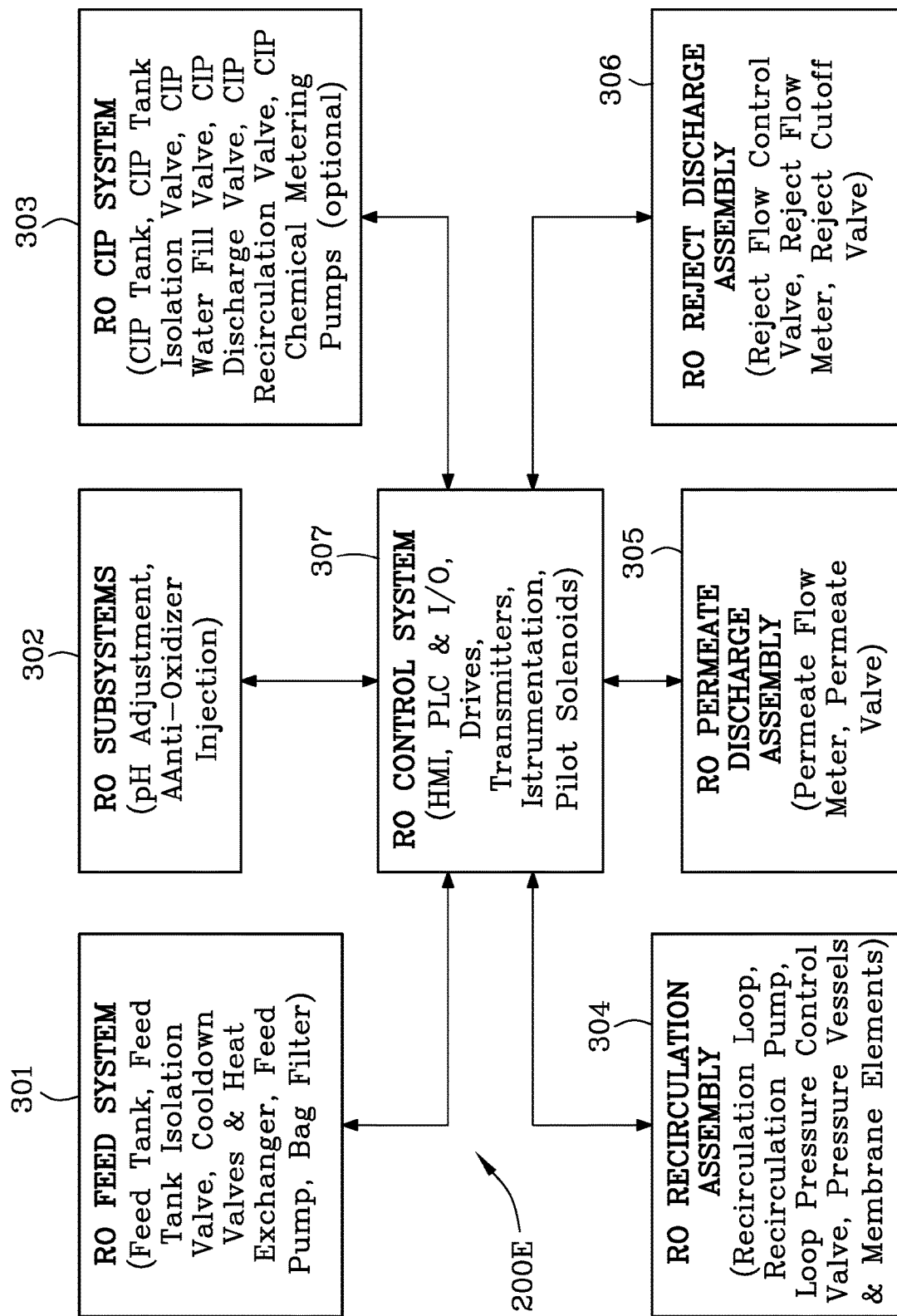
FIG. 2E is a generalized schematic of the reverse osmosis filtration system of the second embodiment.

FIG. 2E is a generalized schematic 200E of the reverse osmosis filtration system of the second embodiment illustrating the RO feed system, RO subsystems, the RO CIP system, the RO circulation system, the RO permeate discharge assembly, the RO reject discharge assembly and the RO control system.

Figure 2F:
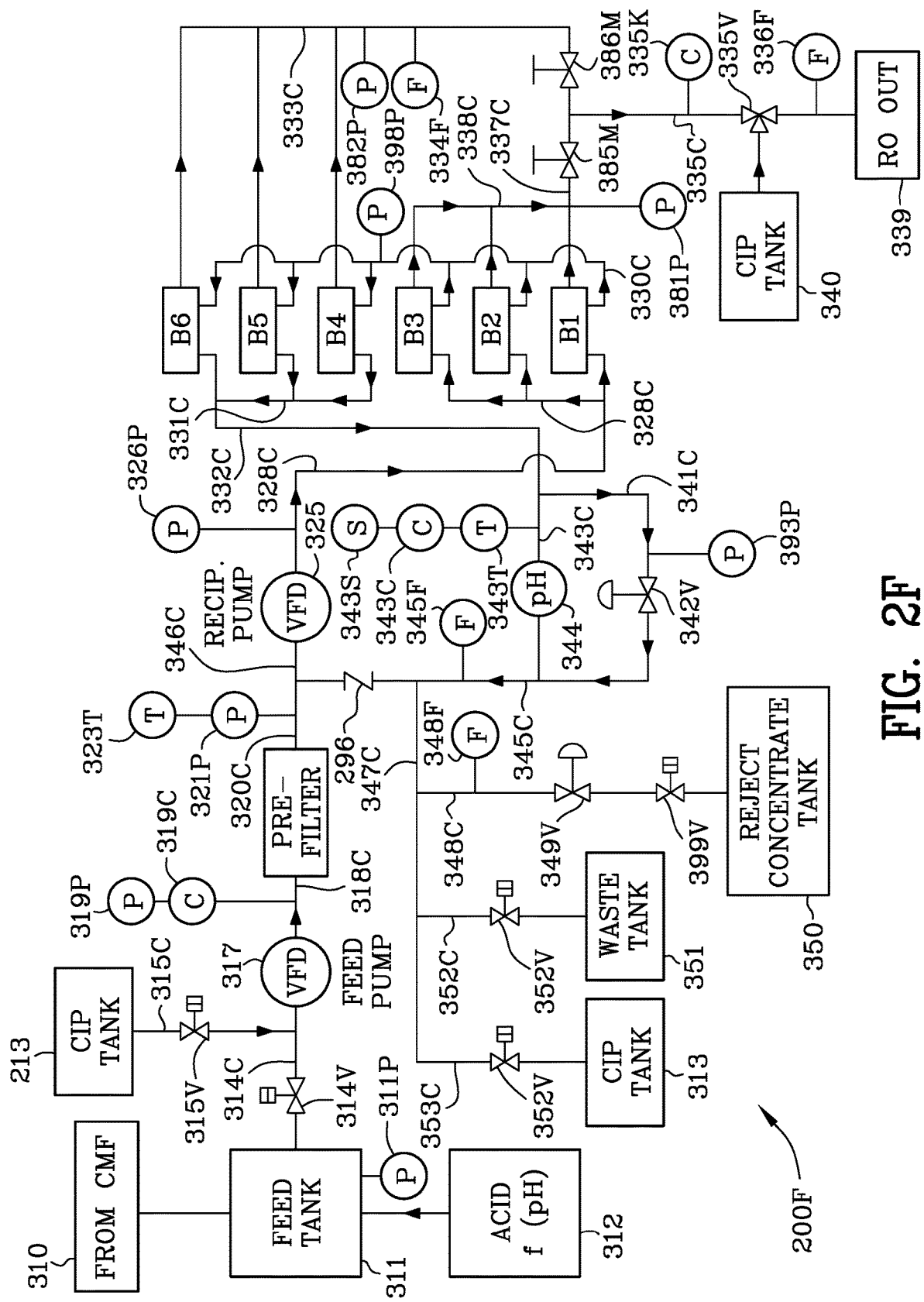
FIG. 2F is another schematic of the reverse osmosis system of the second embodiment.

FIG. 2F is another schematic 200F of the reverse osmosis system of the second embodiment. The filtrate (permeate) output of CMF System #1 and CMF System #2 is combined as indicated in FIG. 2 and is sent 310 to the feed and neutralization tank 311.

Feed water for the RO system is supplied from the RO feed tank 311. Feed water is routed through the RO feed tank isolation valve 314V via conduit 314C into the RO feed pump 317 suction, and pumped through a 10 micron bag prefilter 320 before entering the RO recirculation loop. The recirculation loop includes conduit 346C, recirculation pump 325 driven by a variable frequency drive, conduit 328C interconnecting the recirculation pump 325 and the first stage of the reverse osmosis filter banks B1, B2 and B3, the first stage concentrate reject conduit 330C interconnected with the second stage of the reverse osmosis filter banks B4, B5 and B6, second stage concentrate reject output conduit 331C, reject output conduit 332C leading to and communicating with reject output conduit 341C, modulating control valve 342V and recirculation return conduit 245C, and check valve 296 with return conduit 345 in communication with conduit 346C.

The first stage includes banks B1, B2 and B3. Each of banks B1 and B2 includes 3 housings, and each housing includes four reverse osmosis membranes. B3 includes a bank of 2 housings, and each housing includes four reverse osmosis membranes each. The second stage includes banks B4, B5 and B6. Bank 4 includes 3 housings, and each of the housings includes four reverse osmosis membranes. Each of banks B5 and B6 include 2 housings, and each housing includes four reverse osmosis membranes.

Water is recirculated inside the loop and brought to operating pressure by the recirculation pump 325. When a minimum net driving pressure is achieved, water is forced through the membrane in a direction perpendicular to the recirculating flow. This water, called permeate (filtrate), is collected inside a common header 335C and recycled to the plant for reuse or disposal 339. The second stage banks, B4, B5 and B6 discharge filtrate to a common outlet conduit 333C. The first stage banks B1, B2 and B3 discharge filtrate to a common outlet header 338C which communicates with outlet conduit 337C. Outlet conduits 333C and 337C join and communicate with common header 335C. Common header 335C interconnects with three way valve 335V which is an automatic solenoid operated valve. Clean In Place (CIP) tank 340 communicates with three way valve 335V. Three way valve 335V directs flow of permeate (filtrate) out 339 or permits cleaning of the RO system while isolating the process downstream of RO Out 339.

The remaining water inside the recirculation loop is referred to as reject and/or concentrate and/or reject concentrate. A fraction of the reject concentrate is discarded via conduit 347C which interconnects with conduit 345C downstream from the pneumatically modulated control valve 342V. Reject concentrate in conduit 347C flows to either the reject concentrate tank 350 or a waste tank 351 for further treatment. New feed water (make-up water) from the feed pump 317 replaces the permeated and purged volumes as recirculation is continuous.

The RO system of FIG. 2F of the instant invention is used as a secondary filtration system after the prior ceramic microfiltration (CMF) system. The RO system of the invention is equipped with spiral wound polymeric reverse osmosis membranes. RO is a moderate to high pressure-driven process for separating dissolved solids from water by means of a semi-permeable membrane. RO membranes will reject dissolved solids, including monovalent salts (e.g. sodium chloride). The systems are equipped with spiral wound, polymeric (thin film composite) membranes in cross-flow configuration. This arrangement forces water through a controlled path over the membrane surface at a high flow rate (velocity), thereby enhancing permeate recovery and reducing membrane fouling. The permeate flows axially in a perforated central tube in the center of the RO membrane assembly and the concentrate flows axially in an annular volume surrounding the perforated central tube. The membrane is formed by concentric membranes each separated by a spacer.

Concentration Factor

The RO system of the instant invention separates feed flow into a clean permeate 339 and a heavy concentrate flow in conduit 348C continuously. The concentrate (or reject) flow is only a fraction of the feed flow but contains all of the rejected feed components. The ratio between the feed flow rate and the concentrate flow rate is referred to as the concentration factor (CF):

$$CF = \frac{Flow_{Feed}}{Flow_{Conc.}}$$

The concentration factor is typically adjusted to 5 fold (5×) but can vary depending on the application. A 5× concentration factor stands for an 80% reduction in volume (i.e. 80% recovery of water). In this case the reject stream in conduit 348C is nearly five times as concentrated as the feed stream, containing all of the solids rejected by the membrane. The feed stream or feed flow includes the permeate flow 336F plus the reject concentrate flow 348F.

The loop concentration will influence permeate transport through the membrane and the RO system efficiency will decline for concentration factor adjustments beyond a critical ratio. The programmable logic controller (PLC) computes the concentration factor from flow meter readings 336F, 348F continuously. Flow meter 336F measures and integrates the permeate flow through the common header (conduit) 335C. Flow meter 348F measures and integrates the reject concentrate flow in conduit 348C.

The real time concentration factor is displayed on the RO system status Human Machine Interface (HMI) screen at the control panel. The concentration factor is selectable and input electronically into the control system and the control panel.

Flux Rate

Every wastewater is unique in its quality, concentration and composition and thus exhibits an individual diffusion rate through the Reverse Osmosis membrane, the so called flux rate. The total membrane surface area of a RO system depends on the size and quantity of installed RO elements. Every RO element has a spiral wound sandwich layer structure. In practical terms, the flux rate can be expressed as the permeate production for each RO element, measurement units are in gallons per square foot per day (GFD). The PLC computes flux rate from the integrated permeate flowmeter 336F over a period of time and then dividing integrated flow by the installed membrane surface area.

Process flux rates can vary during the operation and will often slowly decline over time. The operator monitors and logs system data throughout the operation and decide when membrane cleaning becomes necessary.

Transmembrane Pressure

The effective pressure drop over the membrane, the Transmembrane Pressure (TMP), is determined from the pressure difference between the pressures inside the RO elements and the back pressure the permeate experiences on the permeate side. The TMP is calculated as:

$$TMP = \frac{p_{RO\_Module\_IN} + p_{RO\_Module\_OUT}}{2} p_{PERM}.$$

The value of the input pressure 326P to the banks B1-B6 of reverse osmosis elements and the value of the outlet pressure 393P of the banks B1-B6 of reverse osmosis elements are added together and then divided by two, then the value of the outlet pressure of the permeate 381P is subtracted thereform. The calculation is made by the PLC at the control panel. This values identifies when the banks B1-B6 of elements should be cleaned.

Permeate backpressure 381P cannot be adjusted since it is a pure function of hydraulic pressure drop in the permeate piping. The RO vessel inlet pressure 326P can be adjusted by tuning the output of the variable frequency drive (VFD) controller, installed on both the RO feed pump and recirculation pump. Permeate production can thus be increased or decreased by modulating the feed pump speed (RPM) or the recirculation pump speed (RPM).

Membrane Fouling Prevention

Membrane separation is historically plagued by membrane fouling, the formation of a contaminant layer (cake) on the membrane surface, which leads to a rapid decline of permeate flux. Foulants can originate from a variety of sources, some of which are inorganic (e.g. silica), organic (e.g. cationic polymers), colloidal (e.g. silt) or biological (e.g. microbes) in nature. Although concentration polarization is inherent to all membrane processes, the RO system utilizes pretreatment and cross-flow configuration to help mitigate the fouling phenomenon.

The two major processes used for pretreatment are prefiltration and scale control. The RO system illustrated in FIG. 2F is installed downstream of the CMF system illustrated in FIG. 2B, which removes a high percentage of colloidal and particulate matter that would otherwise foul or cause mechanical damage to the membranes of the elements of the RO system.

As permeate (filtrate), water that is relatively low in dissolved solids, passes through the membrane, the remaining reject becomes increasingly concentrated in those same substances. At certain degrees of concentration, the saturation limit of a sparingly soluble salt is exceeded and precipitation occurs. This leads to the formation of scale on the membrane surface, which can severely reduce permeate flow and possibly cause irreversible damage. The RO system may operate under conditions of supersaturation if the addition of antiscalants or chelants is part of the pretreatment process. Reducing the recovery (i.e. lowering the concentration factor) is a simple way to avoid supersaturation conditions. However, this may be undesirable due to the fact that less water is recycled to the plant 339 and more water is discarded as reject 350.

Scale control is also accomplished through pH adjustment. pH, a measure of the acidity or basicity of a solution, plays a role in RO system performance. The RO system of the instant invention doses the feed water with acid 312 to convert ions that favor scale formation into forms that tend to stay soluble, thus making them unavailable for precipitation reactions. See FIG. 2F where acid 312 is injected through an unnumbered conduit by an acid metering pump 312 as dictated by the PLC controller.

The cross-flow configuration allows permeate to flow in a direction perpendicular to that of the bulk (feed) solution. Particles larger than the membrane pore diameter are retained within the recirculation loop. Without intending to be limited by theory, RO membranes actually have no detectable pores and separation is thought to occur through solution-diffusion mechanisms. Particulates cannot easily accumulate on the membrane surface since they are swept away and recirculated continuously at high velocities. The retained liquid inside the recirculation loop is referred to as reject. At startup, the recirculation loop concentration is equal to that of the feed stream; the recirculation loop gradually increases in concentration until a steady balance of material is achieved between the concentrations of the incoming feed and the outgoing permeate and reject streams.

RO System Components

Figure 2G:
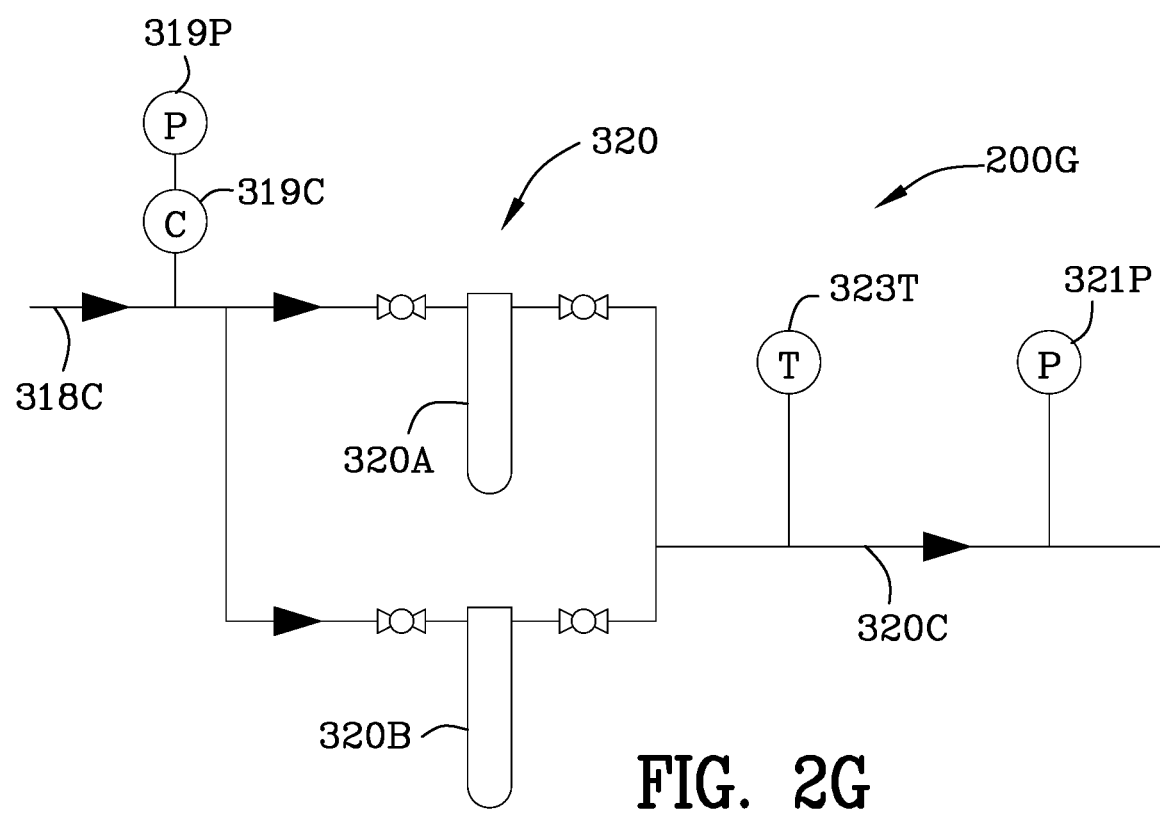
FIG. 2G is a schematic of the prefilter portion of the second embodiment of the reverse osmosis filtration system.

Referring to FIGS. 2E and 2F, the RO feed tank 311 is a flat-bottomed tank constructed of 304 stainless steel and is 7 feet in diameter with a height of 10 feet and a total volume of approximately 2,600 gallons. The RO Feed pump 317 is a centrifugal pump used to transfer water from the RO feed tank 311 to the RO System. The feed pump 317 is a horizontal close coupled pump constructed of 316 stainless steel with a Silicon Carbide/SV/Viton mechanical seal. It is sized for 150 gpm. The pump 317 is powered by a 10 hp, 3450 rpm motor, and feeds water via the conduit 318C to the prefilter 320. The prefilter 320 includes two bag filters within respective housings 320A, 320B and the two housings are located downstream of the RO Feed pump 317. See FIG. 2G wherein the prefilter 320 is illustrated and the two bag filter housings 320A, 320B are shown. The prefilter 320 protects the RO membranes wherein the bag filters in housings 320A, 320B remove coarse contaminants from the feed water. Typical filtration size is 10 μm. The inlet pressure to the prefilter 320 is sensed and transmitted by pressure transmitter 319P to the control panel and the outlet pressure is sensed and transmitted by pressure transmitter 321P to the control panel. The two pressures are used in calculating the TMP (transmembrance pressure) across the prefilter. Water exits the prefilter in conduit 320C. See FIG. 2G which is a schematic of the prefilter portion 340. The equipment and specifications stated herein are by way of example only.

Figure 2H:
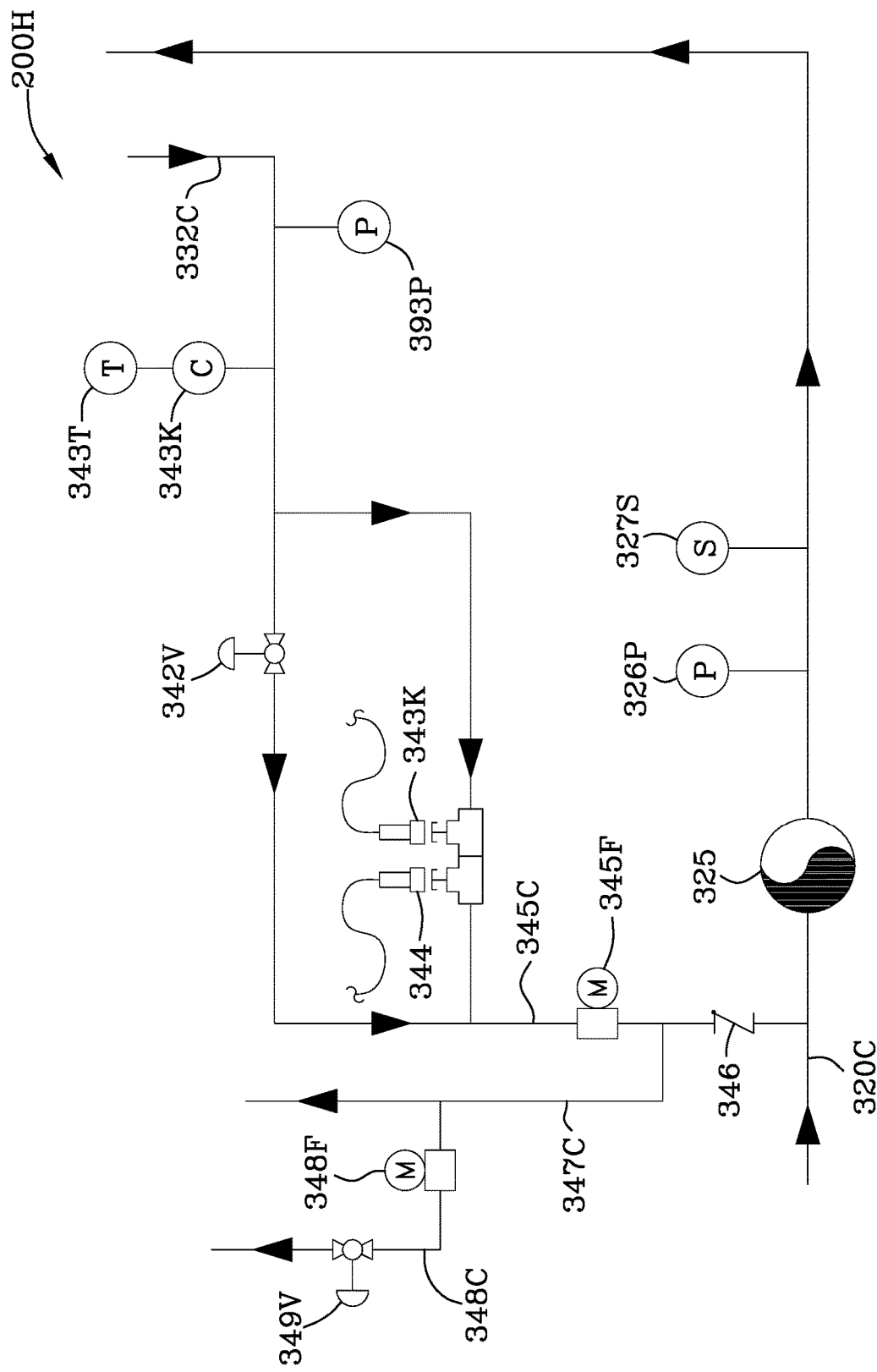
FIG. 2H is a schematic of the recirculation pump, the flow control valve and the reject concentrate flow meter in the recirculation loop.

FIG. 2H is a schematic 200H of the recirculation pump 325, the control valve 342V, and the reject concentrate flow meter 348F and concentrate recirculation flow meter 345M in the recirculation loop. FIGS. 2I and 2J are schematics of banks B1-B6 of reverse osmosis housings 383A-O in the recirculation loop. The system set forth herein by way of example only, is a two stage system. More or fewer stages may be used and more or fewer reverse osmosis membranes are used.

FIGS. 2I and 2J are schematics 200I, 200J of banks of reverse osmosis housings in the recirculation loop. The first stage illustrated in FIG. 2I includes banks B1-B3. The first stage has eight housings 383A-H containing four membranes each. Bank B1 includes housings 383A, 383B and 383C. Water from recirculation pump 325 is discharged into conduit 328C which communicates water to banks B1, B2 and B3 as illustrated in FIGS. 2F and 2I.

Referring to FIG. 2I, bank B1 includes reverse osmosis housings 383A, 383B and 383C. Inlet ports 384A, B, C of bank B1 housings 383A, B, C admit water into the reverse osmosis membranes. Filtrate is discharged from housings 383A, B, C through filtrate outlet ports 386A, B, C to filtrate conduit 338C.

Still referring to FIG. 2I, bank B2 includes reverse osmosis housings 383D, 383E and 383F. Inlet ports 384D, E, F of bank B2 housings 383D, E, F admit water into the reverse osmosis membranes. Filtrate is discharged from housings 383D, E, F through filtrate outlet ports 386D, E, F to filtrate conduit 338C.

Still referring to FIG. 2I, bank B3 includes reverse osmosis housings 383G and 383H. Inlet ports 384G, H of bank B3 housings 383G, H admit water into the reverse osmosis membranes. Filtrate is discharged from housings 383G, H through filtrate outlet ports 386G, H to filtrate conduit 338C.

FIG. 2I further illustrates filtrate conduit 338C joining filtrate outlet conduit 333C as filtrate outlet conduit 335C. Filtrate outlet conduit 335C communicates with three-way valve 335V. Three-way valve 335V (three port valve) directs fluid into filtrate (permeate) outlet 339 for reuse or other disposal. Alternatively three-way valve is repositioned to enable the clean-in-place (CIP) system to function. No specific position of the three-way valve 335V or any two way valve is illustrated in connection with the drawing figures.

Still referring to FIG. 2I, concentrate from bank B1 is discharged from concentrate outlet port 385A of housing 383A to concentrate conduit 330C. Concentrate outlet port 385C of housing 383C communicates with an unnumbered concentrate inlet port of housing 383B. Concentrate outlet port 385B of housing 383B communicates with an unnumbered concentrate inlet port of housing 383A.

Still referring to FIG. 2I, concentrate from bank B2 is discharged from concentrate outlet port 385D of housing 383D to concentrate conduit 330C. Concentrate outlet port 385F of housing 383F communicates with an unnumbered concentrate inlet port of housing 383E. Concentrate outlet port 385E of housing 383E communicates with an unnumbered concentrate inlet port of housing 383D.

Still referring to FIG. 2I, concentrate from bank B3 is discharged from concentrate outlet port 385G of housing 383G to concentrate conduit 330C. Concentrate outlet port 385H of housing 383H communicates with an unnumbered concentrate inlet port of housing 383G.

The second stage illustrated in FIG. 2J includes banks B4-B6. The second stage has seven housings 383I-O containing four membranes each. Bank B4 includes housings 383I, 383J and 383K. Water from concentrate conduit 330C communicates water to banks B4, B5 and B6 as illustrated in FIGS. 2J and 2F.

Referring to FIG. 2J, concentrate conduit 330C communicates concentrate to concentrate Inlet ports 385I (bank B4), 385L (bank B5) and 385N (bank B6). Filtrate from each respective filtrate outlet port 386I, J, K of bank B4 housings 383I, J, K is communicated to conduit 333C. Filtrate from each respective filtrate outlet port 386L, M for bank B5 housings 383L, M is communicated to conduit 333C. Filtrate from each respective filtrate outlet port 386N, O for bank B6 housings 383N, O is communicated to conduit 333C.

Concentrate is communicated from an unnumbered port on housing 383I to concentrate inlet port 385J of housing 383J. Concentrate is communicated from an unnumbered port on housing 383J to concentrate inlet port 385K of housing 383K.

Still referring to FIG. 2J, filtrate flows from housings 383I-O to concentrate conduit 332C. Filtrate flows from filtrate outlet ports 384I (bank B4), 384L (bank B5), and 384N (bank B6) to conduit 332C for return of concentrate to the recirculation loop.

Conduit 332C branches into conduit 343C for measurement and evaluation of concentrate in the recirulation loop by pH meter 344. Conduit 332C also branches into conduit 341C where concentrate enters and is controlled by modulating control valve 342V.

Figure 3B:
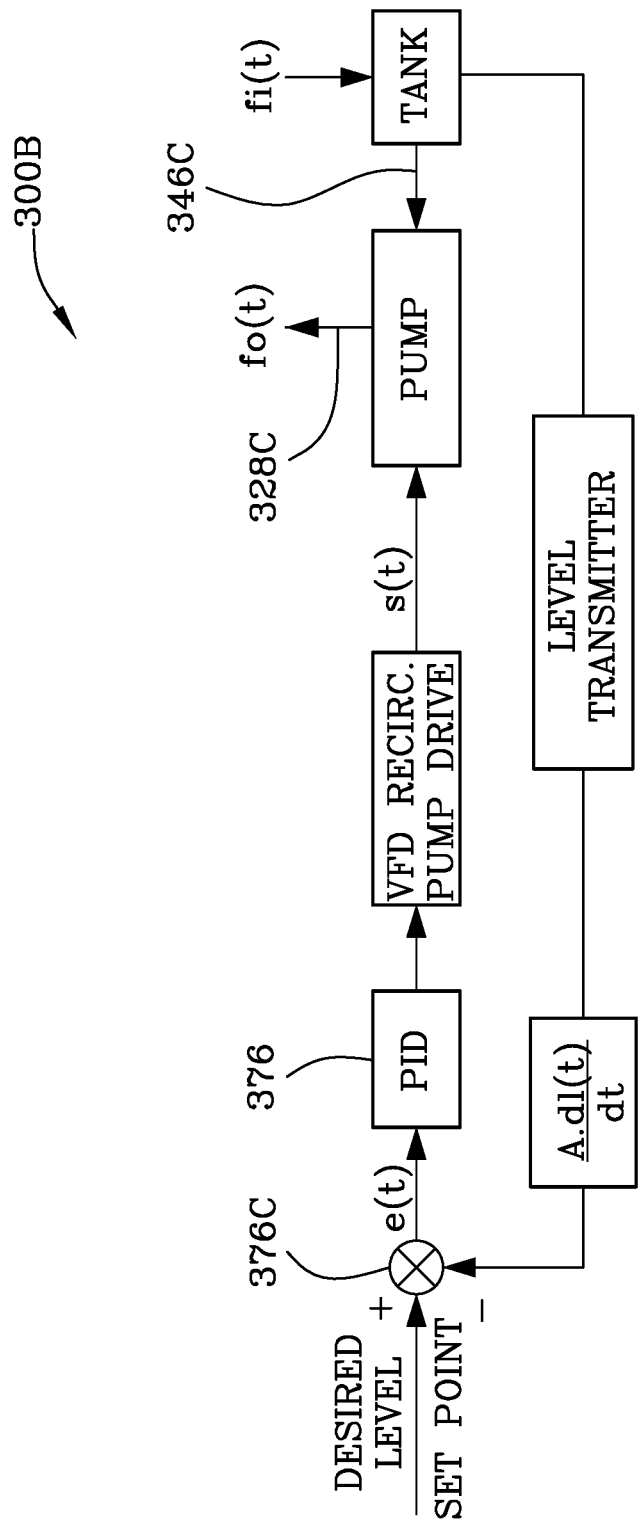
FIG. 3B illustrates the tank level control of the ceramic microfiltration and reverse osmosis systems.
Figure 3C:
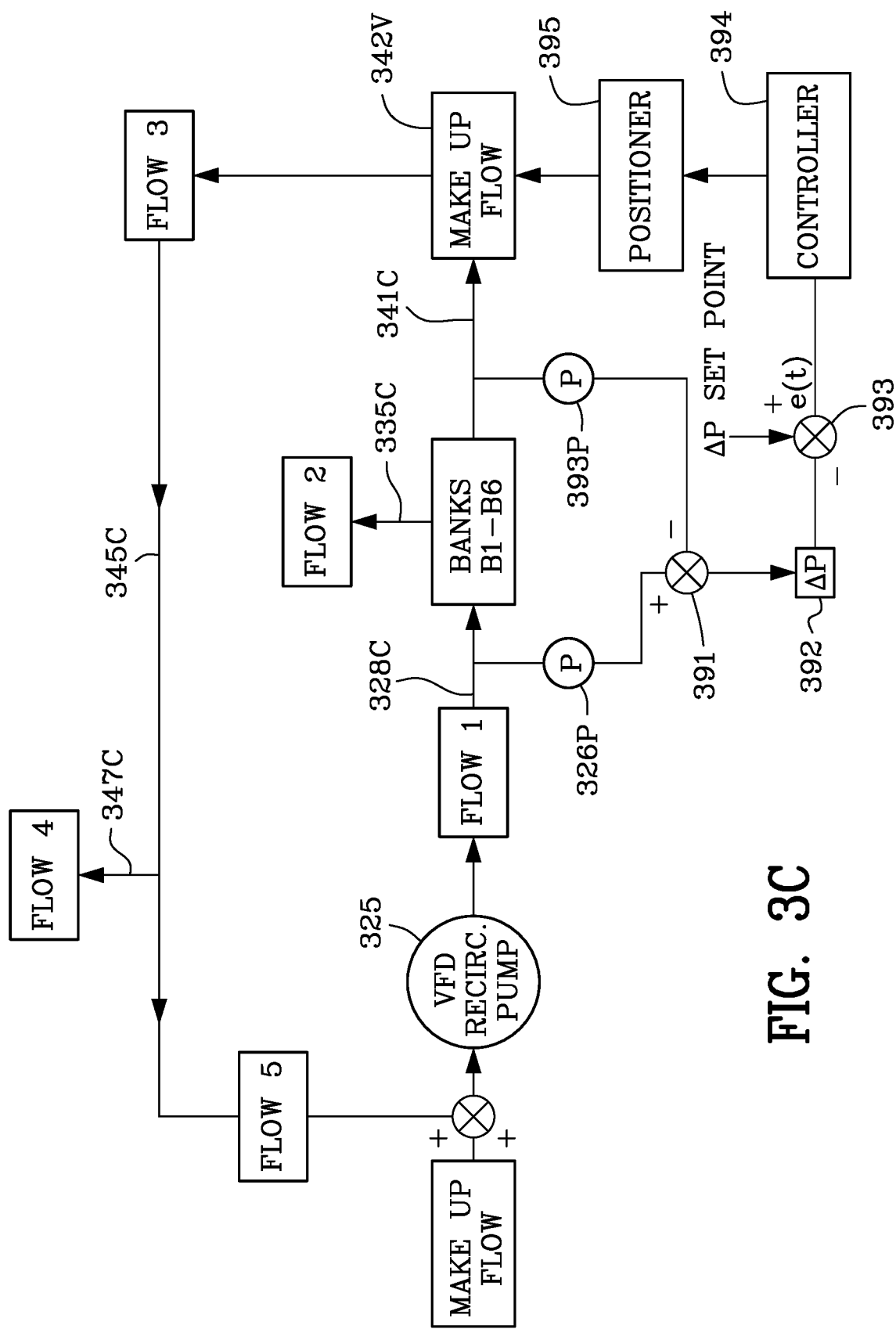
FIG. 3C illustrates the recirculation valve control of the reverse osmosis system.

FIG. 3C illustrates 300C the recirculation valve control 342V of the reverse osmosis system. FIGS. 3C and 2F illustrate pressure transmitter 326P measuring and transmitting the value of the inlet pressure of the concentrate flow to the first stage of the reverse osmosis housings B1-B 3 to the PLC located in the control panel. As stated above, the concentrate admitted to banks B1-B3 which is not expelled as filtrate from outlet filtrate ports 386A-H is forwarded from the first stage of reverse osmosis housings B1-B3 via conduit 330C to the second stage of the reverse osmosis housings B4-B6. Pressure transmitter 398P measures and transmits the intermediate pressure between the first stage (banks B1-B3) of the housings and the second stage (banks B4-B6) of the housings. Pressure transmitter 393P measures and transmits the concentrate outlet pressure of the discharge of the banks B4-B6. Concentrate outlet pressure 393P is the inlet pressure to the recirculation control valve 343V. Pressure transmitter 382P measures and transmits the second stage output pressure of the filtrate to the PLC in the control panel.

The difference in pressure measured by the inlet pressure 326P and the outlet pressure 393P is compared by comparator 391. The ΔP 392 which is compared to the setpoint ΔP by the comparator 393. A setpoint error signal e(t) is generated and is operated on by controller 394 which outputs a signal to positioner 395 which positions recirculation valve 342V in response to the error of the differential pressure across banks B1-B6 of the reverse osmosis system. The position of the recirculation valve dictates the amount of flow through the recirculation valve which, in turn, adjusts the flow and the differential pressure across banks B1-B6 of the reverse osmosis system. Flow through the recirculation valve 342V is returned via conduit 345C where flow 4 is rejected along conduit 347C. Flow 5 is added to make-up flow 6 as illustrated. Recirculation flow 1 is controlled by variable frequency drive control as illustrated in FIG. 3B. The recirculation pump 325 produces a family of pump curves based on pump speed and input head. The recirculation valve 342V functions to vary the system resistance curve which controls the ΔP across banks B1-B6.

FIG. 3B illustrates 300B the tank level control of the ceramic microfiltration and reverse osmosis systems. Desired flow out of the tank is the setpoint. An error signal e(t) is generated by comparing the desired setpoint and comparing it to the rate of change, the derivative, of the level of the tank times the area, A, ((dL(t) times A)/dt). Error as a function of time, e(t), is operated upon by a proportional plus integral plus derivative controller 376 (PID) which outputs a control signal to the VFD recirculation pump drive which, in turn, outputs a speed command, s(t) to the pump which determines the flow out in pump discharge conduit 328C, fo (t). Flow into the tank, fi(t) is determined by process conditions.

A pH probe is mounted in the recirculation loop and measures the full pH range and is made of CPVC and HDPE. It has a flat-surface electrode and is self-cleaning. It provides a signal to the PLC for continuous monitoring of the system pH during normal operation and during CIP (Clean-In-Place) operation.

FIG. 3 is a schematic 300 of the pH control of both the ceramic microfiltration and reverse osmosis systems. The desired setpoint of the pH is compared to the sample measurement 344 of the discharge conduit 332C of the banks of housings. The error signal based on pH is operated on by a 3 point proportional control 377 which can be expanded to more than a 3 point proportional control. The output of the proportional control 377 is operated upon by a metering pump 378 which determines the amount of acid to be injected into the tank 311.

FIG. 3A is a schematic 300A of the reject valve control of both the ceramic microfiltration and reverse osmosis systems. The setpoint is adjustable and is a function of the total flow. The total flow is determined by filtrate flow in conduit 335C as sensed and transmitted by flow meter 336F of the filtrate (permeate) plus the concentrate flow in conduit 345C as sensed and transmitted by flow meter 345F. The reject concentrate flow is determined by flow meter 348F in conduit 348C. The concentration factor may be set be the user and it is the concentrate factor which determines the setpoint. The concentration factor equals the reject concentrate flow/total flow. In the example of FIG. 3A, a concentration factor of 0.2 has been used and the setpoint varies as the total flow changes based on system conditions.

Referring to FIG. 3A, the error signal e(t) is operated on by a proportional plus integral plus derivative controller 356 which outputs a valve position signal 356S. The valve position signal 356S positions the reject valve, 349V and thus controls the reject flow 348F in conduit 348C. The reject flow signal is divided by the total flow and this calculation, made by the PLC, is fed back to the comparator 357.

The second stage has seven housings with four membranes each. The vessels are constructed of fiberglass and these housings are rated for 300 psi and 190° F. There are 60 elements in this RO system. These elements are thin film composite membranes packed in a spiral-wound configuration. Each element is 8 inches in diameter and 40 inches long. These particular membranes are suited for a high temperature application. The recirculation pump 325 is a vertical pump used to boost the pressure and recirculate the water in the recirculation loop. The pump is 316 stainless steel. This pump is sized to pump 200 gpm and is powered by a 50 hp, 3450 rpm motor.

The RO Control Panel houses a disconnect, transformer, motor starters, variable frequency drives, remote input and output modules (both analog and digital), Hand-Off-Auto switches, pressure transducers, an air conditioner, and miscellaneous circuit breakers, fuses and relays. The front of the panel contains control switches, display lights and displays which indicate the current operating conditions.

Pressure transmitters are used to monitor the feed pump discharge pressure 319P, the recirculation loop pressures, 326P, 381P, 398P, 382P, 393P, and permeate pressure 381P, 382P and from these, the transmembrane pressure is determined. Pressure transducer is also used to measure level in the feed and neutralization tank.

Four magnetic-inductive flow meters are used. Recirculation flow 345F in the recirculation loop is measured. Reject concentrate flow 348F rate is measured as is the RO filtrate out flow 336F rate. Flow is also measured 334F coming from the second stage of the RO housings and leading to the combined first and second stage output which is the RO filtrate output. As the wastewater flows through the meter, a signal voltage is created which is directly proportional to the volumetric flow. The flow meters have varying ranges based on application. These can also provide a totalizer function. The meters provides a 4-20 mA output signal to the PLC indicative of the flow therethrough.

There are several pneumatically actuated ball valves 315V, 352V, 399V in the RO System which serve to isolate, among other things, the RO CIP tank, the waste tank, and the reject concentration tank. The air actuated valves provide 2-way (open/close) and 3-way control of flow in the RO System. The valves have solenoid pilot valves which control air to the valve actuators. The valves have manual overrides located near the RO control panel.

A convertible PVDF ORP sensor 343S is provided for online monitoring of the oxidation-reduction potential for the RO. The sensor measures ORP from −2000 to +2000 mV and is constructed with corrosion-resistant materials. Polymeric membranes can be damaged by oxidizers (bleach, permanganate, ozone, bromine, iodine) present in feed water especially at neutral or slightly acidic pH. The RO feed oxidizing-reducing potential (ORP) must be monitored frequently. The RO system features an inline ORP sensor and values are continuously displayed on the System Status screen. ORP can be measured by the maintenance person with a handheld ORP meter. The RO system must not be operated if ORP levels are not below prescribed levels.

Conductivity probes are mounted in the system to monitor performance downstream of the RO feed pump 319C with a cell constant of 5, in the recirculation loop 343C with a cell constant of 10, and in the RO filtrate output 335K with a cell constant of 1. The sensors use a cell constant of 1, 5 or 10 (depending on location) and can measure conductivity ranging from 0 to 5,000 or 200,000 µS/cm. They provide an analog signal to the PLC for continuous monitoring.

Three 1.5-inch long thermocouples are located in the RO system to monitor feed 323T, ambient, and loop 343T temperatures. The thermocouple measures temperature by producing a voltage due to the heating or cooling of the two dissimilar metals (iron and constantan). This voltage is correlated to a temperature by the PLC.

The RO system is cleaned in regular time intervals. These intervals can be varied depending on the application; some installations require periodic cleanings. RO systems must be cleaned regularly to prevent hard-to-remove residue accumulation. Also, a CIP will become necessary if membrane flux rate has decreased significantly, attributable to formation of a membrane "fouling" layer. This foulant layer can be removed using CIP chemicals.

Cleaning solutions contain alkaline, acidic and/or corrosive substances and handling of these chemicals must be performed with caution.

A series of CIP protocols enables successful membrane cleaning from many different contaminants. A standard CIP will target the removal of an organic foulant layer, using a caustic/bleach solution under elevated temperatures, followed by an acidic removal of mineral scaling.

REFERENCE NUMERALS

B1, B2—bank of 3 housings, each housing with four reverse osmosis membranes each, part of first stage reverse osmosis filtering
B3—bank of 2 housings, each housing with four reverse osmosis membranes each, part of first stage reverse osmosis filtering
B4—bank of 3 housings, each housing with four reverse osmosis membranes each, part of second stage reverse osmosis filtering
B5, B6—bank of 2 housings, each housing with four reverse osmosis membranes each, part of second stage reverse osmosis filtering
1, 1A—coarse prefiltration or screen
2, 2A—feed tanks
3, 3A, 3B—ceramic microfiltration system
4—concentrate reject valve
5—filtrate pipe
6, 6A—feed and neutralization tank
7, 7A—reverse osmosis filtration system
8—permeate pipe
9—reject valve
10—acid metering pump
11—pH control sensor
31—inlet, wastewater
32—outlet, wastewater
33—filtrate outlet
34—an abrasion-resistant ceramic membrane filter
35—tube sheet and seal plate
100—schematic of a first embodiment of the overall process illustrating the ceramic filtration portion and the reverse osmosis portion
100A—schematic sectional view of the ceramic filtration portion of the first embodiment of the process
200—schematic of a second embodiment of the overall process illustrating the ceramic filtration portion and the reverse osmosis portion
200A—generalized schematic of the second embodiment of the ceramic microfiltration system
200B—schematic of the second embodiment of the ceramic microfiltration system 200C—schematic of the prefilter portion of the second embodiment of the ceramic microfiltration system
200C—schematic of the modules of the ceramic microfiltration system of the second embodiment
200D—generalized schematic of the reverse osmosis filtration system of the second embodiment
200E—schematic of the reverse osmosis system of the second embodiment
200F—schematic of the prefilter portion of the second embodiment of the reverse osmosis filtration system
200G—schematic of banks of reverse osmosis membranes in the recirculation loop
200H—schematic of the recirculation pump, the control valve and the reject concentrate flow meter in the recirculation loop.
200I, J—schematics of banks of reverse osmosis housings in the recirculation loop.
300—schematic of the pH control of the ceramic microfiltration and reverse osmosis systems.
300A—schematic of the reject valve control of the ceramic microfiltration and reverse osmosis systems
300B—schematic of the tank level control of the ceramic microfiltration and reverse osmosis systems
300C—schematic of the recirculation valve control of the reverse osmosis system.
202—CFM feed system
203—CFM CIP system
204—CFM sub systems
205—CFM recirculation assembly
207—CFM concentrate header
208—CFM filtrate header
209—CFM control module
211—CFM feed tank
211T—level transmitter of feed tank 211
212C—bleach supply conduit to feed tank
212V—pneumatically operated isolation valve in bleach supply conduit to feed tank
213C—base supply conduit to feed tank
213V—pneumatically operated isolation valve in base supply conduit to feed tank
214C—acid supply conduit to feed tank
214V—pneumatically operated isolation valve in acid supply conduit to feed tank
215C—conduit from feed tank to feed pump 218
215V—pneumatically operated isolation valve in conduit 215C from feed tank to feed pump 218
216—flush water
216V—pneumatically operated isolation valve in conduit 216C
217—check valve for flush water supply
218—feed pump driven by a variable frequency drive
218C—conduit from feed pump 218 to prefilter 220
219P—discharge pressure of feed pump 218
220—prefilter
220A—prefilter bag housing
220B—prefilter bag housing
221T—prefilter discharge temperature
222P—prefilter discharge pressure
223C—conduit from prefilter to the recirculation pump 250
250—recirculation pump driven by a variable frequency drive
250C—conduit from recirculation pump 250 to ceramic microfiltration housing A 285
250M—conduit from ceramic microfiltration A 285 concentrate discharge to ceramic microfiltration housing B 286
250R—recirculation loop conduit from concentrate discharge to the recirculation pump
251T—recirculation discharge temperature
252P—recirculation discharge pressure
254S—ceramic microfiltration A 285 sample
256P—discharge pressure of ceramic microfiltration A 285 concentrate
257S—ceramic microfiltration A 286 sample
259P—discharge pressure of ceramic microfiltration A 286 concentrate
260—CFM System #1 filtrate
260C—conduit carrying filtrate 260 from CMF A and CMF module B
260F—flow measurement of CFM System #1 filtrate
260V—pneumatically operated isolation valve for CMF System filtrate
261V—modulating pneumatically actuated control valve for controlling concentrate flow to concentrate collection tank
262—CMF concentrate
263—CMF concentrate collection tank
264C—conduit interconnecting the reject concentrate conduit 281C and the heater 268 and the Clean In Place (CIP) tank
265V—pneumatically operated isolation valve in conduit 264C
266V—pneumatically operated isolation valve in conduit 264C to waste tank 267
267—waste tank
268—heater for CIP solutions
270—acid injection tank controlled by pH control system
270A—CIP tank in conduit 270C
270C—conduit interconnecting conduit 215C and cleaning solutions in CIP tank 270A
270V—pneumatically operated isolation valve in conduit interconnection between the CIP tank 270 and the conduit 215C
271—interconnection to CIP tank 270
272C—conduit interconnecting CIP tank and filtrate conduit 260C
273V—pneumatically operated isolation valve in conduit 272C
275C—conduit interconnecting the acid injection system with the recirculation pump input conduit 223C
280—flow meter measuring CMF concentrate flow
281—reject concentrate conduit
285—CMF A
285P—CMF A output filtrate pressure transmitter
286—CMF B
286P—outlet pressure of CMF B
287C—output filtrate conduit of CMF A interconnected with combined filtrate output 260C
287V—pneumatically controlled isolation valve in conduit 287C
289C—outlet filtration conduit of CMF B interconnected with combined filtrate output 260C
289V—pneumatically operated isolation valve in conduit 289C
290—waste tank
291C—conduit interconnecting a waste tank 290 and the recirculation loop
291V—pneumatically operated waste tank isolation valve in conduit 291C
296—check valve
298—pH sensor and transmitter
298C—sampling conduit for the pH sensor
301—RO feed system
302—RO subsystems
303—RO CIP system 304—RO recirculation assembly
305—RO permeate discharge assembly
306—RO reject discharge assembly
307—RO control system
310—flow from the ceramic microfiltration system
311—feed and neutralization tank
311P—feed tank pressure/level measurement
312—acid metering pump which admits acid to the feed and neutralization tank 311 as necessary for the control of pH
313—CIP tank
314C—conduit from feed and neutralization tank which supplies fluid to the feed pump 317 driven by a variable frequency drive
314V—feed and neutralization pneumatically operated isolation valve
315—CIP tank
315V—pneumatically operated isolation valve for CIP tank
317—feed pump driven by a variable frequency drive
318C—conduit from the feed pump 317 to the prefilter 320
319C—conductivity measurement measured before the prefilter 320
320—prefilter with bag housing which filters the water/fluid prior to entering the reverse osmosis membranes
320C—conduit from the prefilter 320 to the recirculation pump 325 which is driven by a variable frequency drive
321P—pressure after the prefilter 320 in the conduit 320C, this is the inlet pressure to recirculation pump 325
322S—sampling station after the prefilter in the conduit
323T—temperature measurement after the prefilter 320 in the conduit 320C
325—recirculation pump driven by a variable frequency drive
326P—discharge pressure of recirculation pump 325, this is the inlet pressure to the first stage of reverse osmosis filtering, the first stage comprises banks B1, B2 and B3
327S—sample at discharge of recirculation pump 325
328C—conduit from the recirculation pump 325 to the first stage of reverse osmosis filtering
329C—branch conduit feeding liquid to be filtered to banks B1, B2 and B3 of housings having reverse osmosis filters therein
330C—branch conduit feeding concentrate to be filtered to banks B4, B5 and B6 of housings having reverse osmosis filters therein
331C—branch conduit for concentrate return to the recirculation loop via conduit 332C, control valve 342V, conduit 345C, and check valve 346
332C—conduit for return of concentrate to the recirculation loop
333C—conduit for permeate (filtrate) flow from banks B4, B5 and B6 of housings
334F—flow meter for measurement of flow in conduit 333C from banks B4, B5 and B6 of housings
335C—conduit for permeate from first and second stages of reverse osmosis filtering
335V—three way valve controlling permeate flow to the process for reuse or permeating the reverse osmosis system to be cleaned in place
336F—flow meter for measuring permeate flow in conduit 335C
337C—first stage flow conduit
338C—first stage filtrate flow conduit
339—RO output
340—CIP tank
341C—conduit for carrying concentrate to the modulating control valve 342V for return 342V—modulating pneumatic control valve for concentrate in the recirculation loop 341C
343—conduit to pH senor 344
343S—ORP sensor
343T—temperature of concentrate in recirculation loop
344—pH sensor
345C—recirculation conduit
345F—flow meter measuring concentrate recirculation
347C—concentrate reject from recirculation conduit 345C
348C—concentrate reject conduit to reject concentrate tank 350
348F—flow meter measuring reject concentrate flow to the reject concentrate tank 350
349V-modulating valve controlling flow in the concentrate reject conduit to reject concentrate tank 350
350—reject concentrate tank
351—waste tank
352C—conduit for reject concentrate to waste tank 351
352V—pneumatically operated isolation valve in conduit 352C
353C—conduit for reject concentrate to CIP tank 313
353V—pneumatically operated isolation valve in conduit 353C
356—proportional plus integral controller (PID)
356F—division of the reject flow 348F by the total flow 356F
356S—valve position
357—comparator
376—proportional plus integral controller (PID)
376C—comparator
377—3 point proportional control
378—metering pump
381P—first stage permeate output pressure transmitter
382P—second stage permeate output pressure transmitter
383A-H housings, each housing includes four reverse osmosis membranes therein
384A, B, C—inlet ports for bank B1 housings 383A, B, C
384D, E, F—inlet ports for bank B2 housings 383D, E, F
384G, H—inlet ports for bank B3 housings 383G, H
384I, J, K—concentrate outlet ports for bank B4 housings 383I, J, K
384L, M—concentrate outlet ports for bank B2 housings 383L, M
384N, O—concentrate outlet ports for bank B3 housings 383N, O
385A, B, C—concentrate outlet ports for bank B1 housings 383A, B, C
385D, E, F—concentrate outlet ports for bank B2 housings 383D, E, F
385G, H—concentrate outlet ports for bank B3 housings 383G, H
385I, J, K—concentrate inlet ports for bank B4 housings 383I, J, K
385L, M—concentrate inlet ports for bank B5 housings 383L, M
385N, O—concentrate inlet ports for bank B6 housings 383N, O
386A, B, C—filtrate outlet ports for bank B1 housings 383A, B, C communicating with conduit 338C
386D, E, F—filtrate outlet ports for bank B2 housings 383D, E, F communicating with conduit 338C
386G, H—filtrate outlet ports for bank B3 housings 383G, H communicating with conduit 338C
386I, J, K—filtrate outlet ports for bank B4 housings 383I, J, K communicating with conduit 333C
386L, M—filtrate outlet ports for bank B5 housings 383L, M communicating with conduit 333C 386N, O—filtrate outlet ports for bank B6 housings 383N, O communicating with conduit 333C
385M—manual globe valve
386M—manual globe valve
398P—intermediate pressure transmitted between first and second stages of the reverse osmosis system
391—comparator
392—delta P
392S—delta P setpoint
393—comparator
394—controller
395—positioner
399V—isolation valve in conduit 348C which carries the reject concentrate to the reject concentrate tank The invention has been set forth by way of example only. Various equipment specification set forth herein are by way of example only and those skilled will readily recognize that changes in the number of components used, changes in types of components used, and other changes may be made to examples provided herein without departing from the spirit and scope of the invention as set forth in the claims.

The invention claimed is:
1. A water filter comprising a ceramic microfiltration system and a reverse osmosis filtration system, comprising:
a programmable logic controller, PLC;
said ceramic microfiltration, CMF, system includes:
a source of water to be filtered;
a CMF recirculation pump;
a pretreatment element;
a CMF recirculation loop;
a CMF feed pump pumping said water from said source of water to be filtered through said pretreatment element and into said CMF recirculation loop;
a CMF three-point proportional controller;
a CMF acid metering pump;
said CMF three-point proportional controller outputs a signal to said CMF acid metering pump adapted to control acid flow into said source of water to be filtered and adapted to control the pH of said source of water to be filtered before said water to be filtered enters said CMF recirculation pump of said CMF recirculation loop;
said CMF recirculation loop includes said CMF recirculation pump, a CMF module, a return conduit carrying CMF concentrate back to said CMF recirculation pump, and a CMF concentrate reject conduit interconnected with said CMF return conduit for disposal of a CMF concentrate reject;
said CMF concentrate reject conduit includes a CMF concentrate reject valve adapted to control the amount of said CMF concentrate reject flow discharged;
a CMF concentrate reject flow meter adapted to measure CMF concentrate reject flow in said CMF concentrate reject conduit;
said CMF module includes a ceramic element and said ceramic element includes abrasion resistant ceramic filter membranes;
said CMF recirculation pump supplies water to and through said abrasion resistant ceramic filter membranes of said ceramic element;
said CMF module includes a CMF concentrate reject port adapted to communicate CMF concentrate reject to said CMF return conduit;
said CMF module includes a filtrate port; a CMF filtrate conduit in communication with said filtrate port of said CMF module;
a RO feed tank:
said CMF filtrate conduit in communication with said RO feed tank;
a CMF filtrate flow meter in said CMF filtrate conduit adapted to measure CMF filtrate flow to said RO feed tank of said reverse osmosis filtration system;
said PLC adapted to include a desired CMF concentration factor;
said PLC configured to compute an actual CMF concentration factor based on said CMF filtrate flow measured by said CMF filtrate flow meter and based on said CMF concentrate reject flow measured by said CMF concentrate reject flow meter; and,
said PLC configured to modulate said CMF concentrate reject valve varying said reject flow rate based on said computed actual CMF concentration factor in relation to said desired CMF concentration factor;
said reverse osmosis, RO, filtration system includes:
a reverse osmosis pretreatment element;
said RO feed tank adapted to store and receive CMF filtrate water from said ceramic filtration system and is interconnected with a RO feed pump configured to pump said CMF filtrate water through said reverse osmosis pretreatment element and into a RO recirculation loop;
a RO three-point proportional controller;
a RO acid metering pump;
said RO three-point proportional controller outputs a signal to said RO acid metering pump adapted to control acid flow and adapted to control the pH of said water to be filtered before said water to be filtered enters said RO feed pump and said prefilter element before entering said RO recirculation loop;
said RO recirculation loop includes a RO recirculation pump, a first stage of RO filter banks comprising a first stage of RO filter housings and a second stage of RO filter banks comprising a second stage of RO filter housings; a RO return conduit carrying RO concentrate back to said RO recirculation pump, a recirculation control valve in said RO return conduit, and a RO concentrate reject conduit interconnected with said RO return conduit for disposal of a RO concentrate reject;
said RO concentrate reject conduit includes a RO concentrate reject valve adapted to control the amount of said RO concentrate reject flow;
a RO concentrate reject flow meter in said concentrate reject conduit adapted to measure RO concentrate reject flow;
said RO recirculation pump configured to supply water to and through said first and second stages of said RO filter banks and said first and second stages of said filter housings;
each of said RO filter housings of said first and second stages includes a high temperature low fouling RO membrane, an RO inlet port configured for the admission of water to be filtered, a filtrate port adapted to discharge clean water, and a RO concentrate reject port adapted to communicate RO concentrate therefrom;
said reject ports of said first stage of RO filter housings of said first stage of banks discharge to a common discharge conduit which communicates with said RO inlet ports of said second stage of said RO filter housings of said second stage of banks;

said reject ports of said second stage of said RO filter housings communicate with said RO return conduit;

first stage RO filtrate conduits in communication with each of said filtrate ports of said first stage RO filter housings for the discharge of clean water from said first stage RO filter housings;

second stage RO filtrate conduits in communication with each of said filtrate ports of said second stage RO filter housings for the discharge of clean water from said second stage RO filter housings;

said first stage RO filtrate conduits and said second stage RO filtrate conduits are joined together and form an output RO filtrate conduit;

a RO filtrate flow meter in said output RO filtrate conduit adapted to measure RO filtrate flow;

said PLC adapted to include a desired RO concentration factor;

said PLC adapted to compute an actual RO concentration factor based on a said RO filtrate flow and based on said RO concentrate reject flow;

said PLC modulates said RO concentrate reject valve based on said computed actual concentration factor in relation to said desired RO concentration factor;

an inlet pressure transmitter configured to measure and transmit the inlet pressure of said RO concentrate flow to said first stage of said reverse osmosis housings to said PLC; an intermediate pressure transmitter configured to measure and transmit the intermediate pressure of said RO concentrate between said first stage of said housings and said second stage of said housings to said PLC; and, an outlet pressure transmitter configured to measure and transmit the concentrate outlet pressure of the second stage of said reverse osmosis housings to said PLC;

said RO concentrate outlet pressure is the inlet pressure to said recirculation control valve in said RO return conduit; and, said PLC is configured to compute a difference in pressure measured between said inlet pressure and said outlet pressure across said first and second stages of said banks of said reverse osmosis housings; said PLC is configured to form a ΔP which is compared to a setpoint ΔP; said PLC computes a setpoint error signal, e(t), which is operated on by a control function of the PLC which outputs a signal to a positioner which is configured to position said recirculation control valve in response to said error e(t) of said differential pressure across said banks of said reverse osmosis housings and the position of said recirculation valve dictates the amount of concentrate flow through said recirculation control valve which, in turn, is configured to adjust the flow and the differential pressure across said first and second stages of said banks of said reverse osmosis housings.

2. The water filter comprising a ceramic microfiltration system and a reverse osmosis filtration system as claimed in claim 1, further comprising:
said abrasion resistant ceramic filter membranes of said ceramic filter module are tubular and oriented in-line with the direction of the flow of the concentrate;
said tubular abrasion resistant ceramic filter membranes have pores, and said pore diameter size is 0.05 microns; and,
particles in said water having a diameter greater than 0.05 microns are retained within said recirculation loop.

3. The water filter comprising a ceramic microfiltration system and a reverse osmosis filtration system as claimed in claim 1, further comprising:
said CMF filtrate is removed perpendicularly to said water flow.

4. The water filter comprising a ceramic microfiltration system and a reverse osmosis filtration system as claimed in claim 1, further comprising:
said PLC is adapted to monitor and process a transmembrane pressure of said CMF module, said transmembrane pressure is calculated as: (inlet plus outlet pressures of the concentrate)/2 minus the (pressure of the filtrate).

5. The water filter comprising a ceramic microfiltration system and a reverse osmosis filtration system as claimed in claim 1, further comprising:
said high temperature low fouling RO membrane is a spiral wound thin film polymeric membrane in a cross-flow configuration.

6. The water filter comprising a ceramic microfiltration system and a reverse osmosis filtration system as claimed in claim 5, further comprising:
a RO membrane assembly including:
a perforated central tube which carries permeate axially therein; and,
a concentric membrane separated by a spacer which carries concentrate therein.

7. The water filter as claimed in claim 2, further comprising:
said actual CMF concentration factor is computed as the (CMF filtrate flow plus the CMF concentrate reject flow) divided by the (CMF reject flow); and,
said actual RO concentration factor is computed as the (RO filtrate flow plus the RO concentrate reject flow) divided by the (RO reject flow).

8. The water filter as claimed in claim 1, further comprising:
said PLC adapted to control said CMF concentrate reject valve based on said concentration factor includes a proportional plus integral controller; and,
said PLC adapted to control said RO concentrate reject valve based on said concentration factor includes a proportional plus integral controller.

9. The water filter as claimed in claim 1, further comprising:
the CMF feed pump and the CMF recirculation pump are driven by variable frequency drives; and,
the RO feed pump and the RO recirculation pump are driven by variable frequency drives.

10. The water filter as claimed in claim 9, further comprising:
said CMF feed pump supplies make-up water to said CMF recirculation loop to replace CMF filtrate and CMF concentrate removed from said CMF recirculation loop.

11. The water filter as claimed in claim 9, further comprising: said RO feed pump supplies make-up water to said RO recirculation loop to replace RO filtrate and RO concentrate removed from said RO recirculation loop.

12. The water filter as claimed in claim 1, further comprising:
another CMF module in series with said CMF module.

* * * * *